United States Patent
Arnone et al.

(10) Patent No.: US 10,510,215 B2
(45) Date of Patent: Dec. 17, 2019

(54) TOURNAMENT ENTRY MECHANISMS WITHIN A GAMBLING INTEGRATED GAME OR SKILL WAGERING INTERLEAVED GAME

(71) Applicant: Gamblit Gaming, LLC, Glendale, CA (US)

(72) Inventors: Miles Arnone, Sherborn, MA (US); Eric Meyerhofer, Pasadena, CA (US); Caitlyn Ross, Watertown, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 96 days.

(21) Appl. No.: 14/981,775

(22) Filed: Dec. 28, 2015

(65) Prior Publication Data

US 2016/0110962 A1 Apr. 21, 2016

Related U.S. Application Data

(63) Continuation of application No. PCT/US2014/043972, filed on Jun. 24, 2014.
(Continued)

(51) Int. Cl.
*G07F 17/32* (2006.01)
*A63F 13/00* (2014.01)

(52) U.S. Cl.
CPC .......... *G07F 17/3276* (2013.01); *A63F 13/00* (2013.01); *G07F 17/3246* (2013.01);
(Continued)

(58) Field of Classification Search
CPC .. G07F 17/32; G07F 17/3267; G07F 17/3276; G07F 17/3286
(Continued)

(56) References Cited

U.S. PATENT DOCUMENTS 4,882,675 A * 11/1989 Nichtberger ......... G06Q 20/387
235/381
5,413,357 A 5/1995 Schulze et al.
(Continued)

OTHER PUBLICATIONS

U.S. Appl. No. 14/205,303 Arnone, et al., filed Mar. 11, 2014.
(Continued)

*Primary Examiner* — William H McCulloch, Jr.
*Assistant Examiner* — Chase E Leichliter

(57) ABSTRACT

Systems and methods for operating a tournament entry mechanism in a skill wagering interleaved game are disclosed. A tournament entry mechanism in a skill wagering game is provides an entertainment game and a gambling game. The entertainment game is provided by an entertainment system and is managed by a game world operating system. The gambling game is provided by a real credit operating system. The skill wagering interleaved game with tournament entry mechanism also provides tournament "tickets" that may be obtained during gameplay of the entertainment game and used to gain tournament entry. One or more tickets may be required to gain entry into a particular tournament and different tournaments may specify different sets of ticket requirements. A player may accumulate tickets through the skillful gameplay of the entertainment game and/or a combination of skillful gameplay and/or randomly provided to a player during the gameplay of the entertainment game.

5 Claims, 17 Drawing Sheets

Related U.S. Application Data

(60) Provisional application No. 61/838,957, filed on Jun. 25, 2013.

(52) U.S. Cl.
CPC ...... *G07F 17/3248* (2013.01); *G07F 17/3251* (2013.01); *G07F 17/3286* (2013.01); *G07F 17/3267* (2013.01)

(58) Field of Classification Search
USPC .............................. 463/1, 9, 16, 23, 25, 29
See application file for complete search history.

(56) References Cited

U.S. PATENT DOCUMENTS

| | | | |
|---|---|---|---|
| 5,718,429 A | 2/1998 | Keller | |
| 5,785,592 A | 7/1998 | Jacobsen | |
| 5,853,324 A | 12/1998 | Kami et al. | |
| 5,963,745 A | 10/1999 | Collins et al. | |
| 6,050,895 A | 4/2000 | Luciano | |
| 6,165,071 A | 12/2000 | Weiss | |
| 6,227,974 B1 | 5/2001 | Eilat | |
| 6,267,669 B1 | 7/2001 | Luciano | |
| 6,685,563 B1 | 2/2004 | Meekins et al. | |
| 6,712,693 B1 | 3/2004 | Hettinger | |
| 6,761,632 B2 | 7/2004 | Bansemer et al. | |
| 6,761,633 B2 | 7/2004 | Riendeau | |
| 6,764,397 B1 | 7/2004 | Robb | |
| 6,811,482 B2 | 11/2004 | Letovsky | |
| 7,118,105 B2 | 10/2006 | Benevento | |
| 7,294,058 B1 | 11/2007 | Slomiany | |
| 7,326,115 B2 | 2/2008 | Baerlocher | |
| 7,361,091 B2 | 4/2008 | Letovsky | |
| 7,517,282 B1 | 4/2009 | Pryor | |
| 7,575,517 B2 | 8/2009 | Parham et al. | |
| 7,682,239 B2 | 3/2010 | Friedman et al. | |
| 7,720,733 B2 | 5/2010 | Jung | |
| 7,753,770 B2 | 7/2010 | Walker et al. | |
| 7,753,790 B2 | 7/2010 | Nguyen | |
| 7,766,742 B2 | 8/2010 | Bennett et al. | |
| 7,775,885 B2 | 8/2010 | Van Luchene | |
| 7,798,896 B2 | 9/2010 | Katz | |
| 7,824,267 B2* | 11/2010 | Cannon ................... | G07F 17/32 340/323 R |
| 7,828,657 B2 | 11/2010 | Booth | |
| 7,917,371 B2 | 3/2011 | Jung et al. | |
| 7,931,531 B2 | 4/2011 | Oberberger | |
| 7,938,727 B1 | 5/2011 | Konkle | |
| 7,950,993 B2 | 5/2011 | Oberberger | |
| 7,967,674 B2 | 6/2011 | Baerlocher | |
| 7,980,948 B2 | 7/2011 | Rowe | |
| 7,996,264 B2 | 8/2011 | Kusumoto et al. | |
| 8,012,023 B2 | 9/2011 | Gates | |
| 8,047,908 B2 | 11/2011 | Walker | |
| 8,047,915 B2 | 11/2011 | Lyle | |
| 8,060,829 B2 | 11/2011 | Jung et al. | |
| 8,075,383 B2 | 12/2011 | Friedman et al. | |
| 8,087,999 B2 | 1/2012 | Oberberger | |
| 8,113,938 B2 | 2/2012 | Friedman et al. | |
| 8,118,654 B1 | 2/2012 | Nicolas | |
| 8,128,487 B2 | 3/2012 | Hamilton et al. | |
| 8,135,648 B2 | 3/2012 | Oram | |
| 8,137,193 B1 | 3/2012 | Kelly et al. | |
| 8,142,272 B2 | 3/2012 | Walker | |
| 8,157,653 B2 | 4/2012 | Buhr | |
| 8,167,699 B2 | 5/2012 | Inamura | |
| 8,177,628 B2 | 5/2012 | Manning | |
| 8,182,338 B2 | 5/2012 | Thomas | |
| 8,182,339 B2 | 5/2012 | Anderson | |
| 8,187,068 B2 | 5/2012 | Slomiany | |
| 8,206,210 B2 | 6/2012 | Walker | |
| 8,308,544 B2 | 11/2012 | Friedman | |
| 8,430,735 B2 | 4/2013 | Oberberger | |
| 8,475,266 B2 | 7/2013 | Arnone | |
| 8,480,470 B2 | 7/2013 | Napolitano et al. | |
| 8,622,809 B1 | 1/2014 | Arora et al. | |
| 8,864,564 B2 | 10/2014 | Oberberger | |
| 2001/0004609 A1 | 6/2001 | Walker et al. | |
| 2001/0019965 A1 | 9/2001 | Ochi | |
| 2002/0022509 A1 | 2/2002 | Nicastro et al. | |
| 2002/0090990 A1 | 7/2002 | Joshi et al. | |
| 2002/0175471 A1 | 11/2002 | Faith | |
| 2003/0060286 A1 | 3/2003 | Walker et al. | |
| 2003/0119576 A1 | 6/2003 | McClintic et al. | |
| 2003/0125107 A1* | 7/2003 | Cannon ................... | G07F 17/32 463/25 |
| 2003/0139214 A1 | 7/2003 | Wolf et al. | |
| 2003/0171149 A1 | 9/2003 | Rothschild | |
| 2003/0204565 A1 | 10/2003 | Guo et al. | |
| 2003/0211879 A1 | 11/2003 | Englman | |
| 2004/0092313 A1 | 5/2004 | Saito et al. | |
| 2004/0097610 A1 | 5/2004 | Saito | |
| 2004/0102238 A1 | 5/2004 | Taylor | |
| 2004/0121839 A1 | 6/2004 | Webb | |
| 2004/0225387 A1 | 11/2004 | Smith | |
| 2005/0003878 A1 | 1/2005 | Updike | |
| 2005/0096124 A1 | 5/2005 | Stronach | |
| 2005/0116411 A1 | 6/2005 | Herrmann et al. | |
| 2005/0192087 A1 | 9/2005 | Friedman et al. | |
| 2005/0233791 A1 | 10/2005 | Kane | |
| 2005/0233806 A1 | 10/2005 | Kane et al. | |
| 2005/0239538 A1 | 10/2005 | Dixon | |
| 2005/0269778 A1 | 12/2005 | Samberg | |
| 2005/0288101 A1 | 12/2005 | Lockton et al. | |
| 2006/0003823 A1 | 1/2006 | Zhang | |
| 2006/0003830 A1 | 1/2006 | Walker et al. | |
| 2006/0035696 A1 | 2/2006 | Walker | |
| 2006/0040735 A1 | 2/2006 | Baerlocher | |
| 2006/0068913 A1 | 3/2006 | Walker et al. | |
| 2006/0084499 A1 | 4/2006 | Moshal | |
| 2006/0084505 A1 | 4/2006 | Yoseloff | |
| 2006/0135250 A1 | 6/2006 | Rossides | |
| 2006/0154710 A1 | 7/2006 | Serafat | |
| 2006/0166729 A1 | 7/2006 | Saffari et al. | |
| 2006/0189371 A1 | 8/2006 | Walker et al. | |
| 2006/0223611 A1 | 10/2006 | Baerlocher | |
| 2006/0234791 A1 | 10/2006 | Nguyen et al. | |
| 2006/0240890 A1 | 10/2006 | Walker | |
| 2006/0246403 A1 | 11/2006 | Monpouet et al. | |
| 2006/0258433 A1 | 11/2006 | Finocchio et al. | |
| 2007/0026924 A1 | 2/2007 | Taylor | |
| 2007/0035548 A1 | 2/2007 | Jung et al. | |
| 2007/0038559 A1 | 2/2007 | Jung et al. | |
| 2007/0064074 A1 | 3/2007 | Silverbrook et al. | |
| 2007/0087799 A1 | 4/2007 | Van Luchene | |
| 2007/0093299 A1 | 4/2007 | Bergeron | |
| 2007/0099696 A1 | 5/2007 | Nguyen et al. | |
| 2007/0105612 A1* | 5/2007 | Fotevski .................. | G07F 17/32 463/16 |
| 2007/0117641 A1 | 5/2007 | Walker et al. | |
| 2007/0129149 A1 | 6/2007 | Walker | |
| 2007/0142108 A1 | 6/2007 | Linard | |
| 2007/0156509 A1 | 7/2007 | Jung et al. | |
| 2007/0167212 A1 | 7/2007 | Nguyen | |
| 2007/0167239 A1 | 7/2007 | O'Rourke | |
| 2007/0173311 A1 | 7/2007 | Morrow et al. | |
| 2007/0191104 A1 | 8/2007 | Van Luchene | |
| 2007/0202941 A1 | 8/2007 | Miltenberger | |
| 2007/0203828 A1 | 8/2007 | Jung et al. | |
| 2007/0207847 A1 | 9/2007 | Thomas | |
| 2007/0244757 A1* | 10/2007 | Walter .................... | G06Q 30/02 705/14.14 |
| 2007/0259717 A1 | 11/2007 | Mattice | |
| 2007/0293306 A1 | 12/2007 | Nee et al. | |
| 2008/0004107 A1 | 1/2008 | Nguyen et al. | |
| 2008/0014835 A1 | 1/2008 | Weston et al. | |
| 2008/0015004 A1 | 1/2008 | Gatto et al. | |
| 2008/0064488 A1 | 3/2008 | Oh | |
| 2008/0070659 A1 | 3/2008 | Naicker | |
| 2008/0070690 A1 | 3/2008 | Van Luchene | |
| 2008/0070702 A1 | 3/2008 | Kaminkow | |
| 2008/0096665 A1 | 4/2008 | Cohen | |
| 2008/0108406 A1 | 5/2008 | Oberberger | |
| 2008/0108425 A1 | 5/2008 | Oberberger | |

(56) References Cited

U.S. PATENT DOCUMENTS

| | | |
|---|---|---|
| 2008/0113704 A1 | 5/2008 | Jackson |
| 2008/0119283 A1 | 5/2008 | Baerlocher |
| 2008/0146308 A1 | 6/2008 | Okada |
| 2008/0161081 A1 | 7/2008 | Berman |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318559 A1* | 12/2008 | Porco .......... G06Q 30/0267 455/414.2 |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |
| 2009/0104960 A1* | 4/2009 | Kelly .......... G07F 17/3267 463/16 |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0275393 A1 | 11/2009 | Kisenwether |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0250368 A1* | 9/2010 | Porco .......... G06Q 30/0241 705/14.58 |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0009187 A1* | 1/2011 | Mastropietro .......... G07F 17/32 463/25 |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0258068 A1* | 10/2011 | Asher .......... G06Q 20/1085 705/26.3 |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0264495 A1* | 10/2012 | Amaitis .......... G07F 17/3267 463/10 |
| 2012/0302310 A1* | 11/2012 | Kelly .......... A63F 3/081 463/17 |
| 2012/0302311 A1 | 11/2012 | Luciano |
| 2012/0322545 A1* | 12/2012 | Arnone .......... G07F 17/3272 463/25 |
| 2013/0029760 A1 | 1/2013 | Wickett |
| 2013/0054336 A1* | 2/2013 | Graylin .......... H04L 67/02 705/14.26 |
| 2013/0131848 A1 | 5/2013 | Arnone et al. |
| 2013/0190074 A1 | 7/2013 | Arnone et al. |
| 2013/0204923 A1* | 8/2013 | Gibson .......... G06Q 30/02 709/203 |
| 2013/0260869 A1 | 10/2013 | Leandro et al. |
| 2014/0066194 A1* | 3/2014 | Cage .......... G07F 17/3223 463/29 |
| 2014/0087801 A1 | 3/2014 | Nicely et al. |
| 2014/0087808 A1 | 3/2014 | Leandro et al. |
| 2014/0087809 A1 | 3/2014 | Leupp et al. |
| 2014/0357350 A1 | 12/2014 | Weingardt et al. |

OTHER PUBLICATIONS

U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.

(56) References Cited

OTHER PUBLICATIONS

U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
International Search Report and Written Opinion, PCT/US2014/043972, dated Nov. 3, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.

(56) References Cited

OTHER PUBLICATIONS

U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.

* cited by examiner

| Level Completed | Ticket(s) Awarded |
|---|---|
| 1 | One blue ticket |
| 2 | One blue ticket |
| 3 | Two blue tickets, One gold ticket |
| 4 | Two gold tickets |
| 5 | Three gold tickets |
| 6 | Three gold tickets |

*FIG. 10A*

| Tournament | Prize Characteristics | Tickets Required |
|---|---|---|
| Low Skill | Many small prizes | Two blue tickets |
| Low/Medium Skill | One moderate value prize | Three blue tickets |
| Medium Skill | Several moderate value prizes | One gold ticket |
| High Skill | One large value prize, several moderate value prizes | Three gold tickets |

*FIG. 10B*

| Level Completed | Ticket(s) Awarded |
|---|---|
| 1 | One blue ticket |
| 2 | One blue ticket |
| 3 | One red tickets |
| 4 | One gold ticket |
| 5 | One gold ticket |
| 6 | One gold tickets |

*FIG. 11A*

| Tournament | Prize Characteristics | Tickets Required |
|---|---|---|
| Low Skill | Many small prizes | Six blue tickets |
| Medium Skill | Several moderate value prizes | Four red tickets |
| High Skill | One large value prize, several moderate value prizes | Three gold tickets |

*FIG. 11B*

TOURNAMENT ENTRY MECHANISMS WITHIN A GAMBLING INTEGRATED GAME OR SKILL WAGERING INTERLEAVED GAME

CROSS REFERENCE TO RELATED APPLICATIONS

The current application is a continuation of Patent Cooperation Treaty Application No. PCT/US14/43972, filed Jun. 24, 2014, which claims the benefit of U.S. Provisional Application No. 61/838,957, filed Jun. 25, 2013, the disclosure of which is incorporated herein by reference as if set forth herewith. This application references Patent Cooperation Treaty Application No. PCT/US11/26768, filed Mar. 1, 2011, now U.S. Pat. No. 8,632,395, issued Jan. 21, 2014, Patent Cooperation Treaty Application No. PCT/US11/63587, filed Dec. 6, 2011, published as US Patent Application Publication No. 2013/0296021 A1, and Patent Cooperation Treaty Application No. PCT/US12/58156, filed Sep. 29, 2012, now U.S. Pat. No. 8,790,170, issued Jul. 29, 2014, and U.S. Pat. No. 8,944,899, issued Feb. 3, 2015, and US Patent Application Publication No. 2015/0141128 A1, the contents of each of which are hereby incorporated by reference.

FIELD OF THE INVENTION

Embodiments of the present invention are generally related to gaming and more specifically to tournament entry mechanisms within a gambling integrated game or skill wagering interleaved game.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game can depend upon a player's skill playing the game. Gambling games are typically not as interactive as skill games and do not include graphics as sophisticated as the graphics presented in a skill game, such as a video game provided for entertainment.

SUMMARY OF THE INVENTION

Systems and methods in accordance with embodiments of the invention provide tournament entry mechanisms in a skill wagering interleaved game. A casino electronic game machine providing a tournament entry mechanism in a gambling hybrid game that includes an entertainment game and a gambling game, may include a real credit operating system including a real world credit meter; a random number generator; and a real world credit pay table, where the real credit operating system is configured to receive real world credit from a portable media, where the portable media includes at least one member of a group including currency, a voucher and a smart card; and provide a randomly generated payout of real world credits from a wager of real world credits in the gambling game using the random number generator and real world credit pay table; augment an amount of real world credits stored in the real world credit meter based on the randomly generated payout of real world credits to the real world credit meter; an entertainment game system constructed to execute the entertainment game to resolve a random event in the entertainment game to generate random event results; provide the random event results to a game world operating system; and update a display screen with tournament ticket information; the display screen configured to display the random event results of the wagers; and display the tournament ticket information; a user input device configured to receive from a player a wagering amount to use during game play; and the game world operating system constructed to determine an occurrence of a gambling event in the gambling game based on play of the entertainment game executed by the entertainment game system; request a resolution to the gambling event by the real credit operating system; determine gambling results based upon the random event results; determine tournament tickets to provide to a player account based on gameplay of the entertainment game and the result of the gambling event; update the player account with the tournament ticket information and send the tournament ticket information to the entertainment game system; provide the gambling results to the entertainment game system for use in executing the entertainment game.

In accordance with many embodiments, the game world operating system is further constructed to determine at least one of an amount and a species of tournament tickets to provide to the player account based on gameplay of the entertainment game.

In accordance with various embodiments, different species of tickets have different values, where one or more lower value species of tournament tickets is tradable for a higher value species of a tournament ticket.

In accordance with numerous embodiments, the game world operating system is further constructed to determine the tournament tickets to provide to the player based on levels completed during gameplay of the entertainment game.

In accordance with many embodiments, the game world operating system is further constructed to determine the tournament tickets to provide to the player based on tournament tickets explicitly obtained by the player during gameplay of the entertainment game.

In accordance with various embodiments, the game world operating system is further constructed to determine the tournament tickets to provide to the player based on a random award of tournament tickets determined by a random number generator.

In accordance with many embodiments, the game world operating system is further constructed to determine to request the real credit operating system to determine the result of the gambling event based on an updated status of the entertainment game.

BRIEF DESCRIPTION OF THE DRAWINGS

FIGS. 10A and 10B illustrate examples of tickets that may be awarded to players during gameplay of the entertainment game and the ticket requirements for entry into tournaments.

FIGS. 11A and 11B illustrate examples of accumulated tickets and ticket requirements for entry into tournaments.

DETAILED DESCRIPTION

Figure 1:
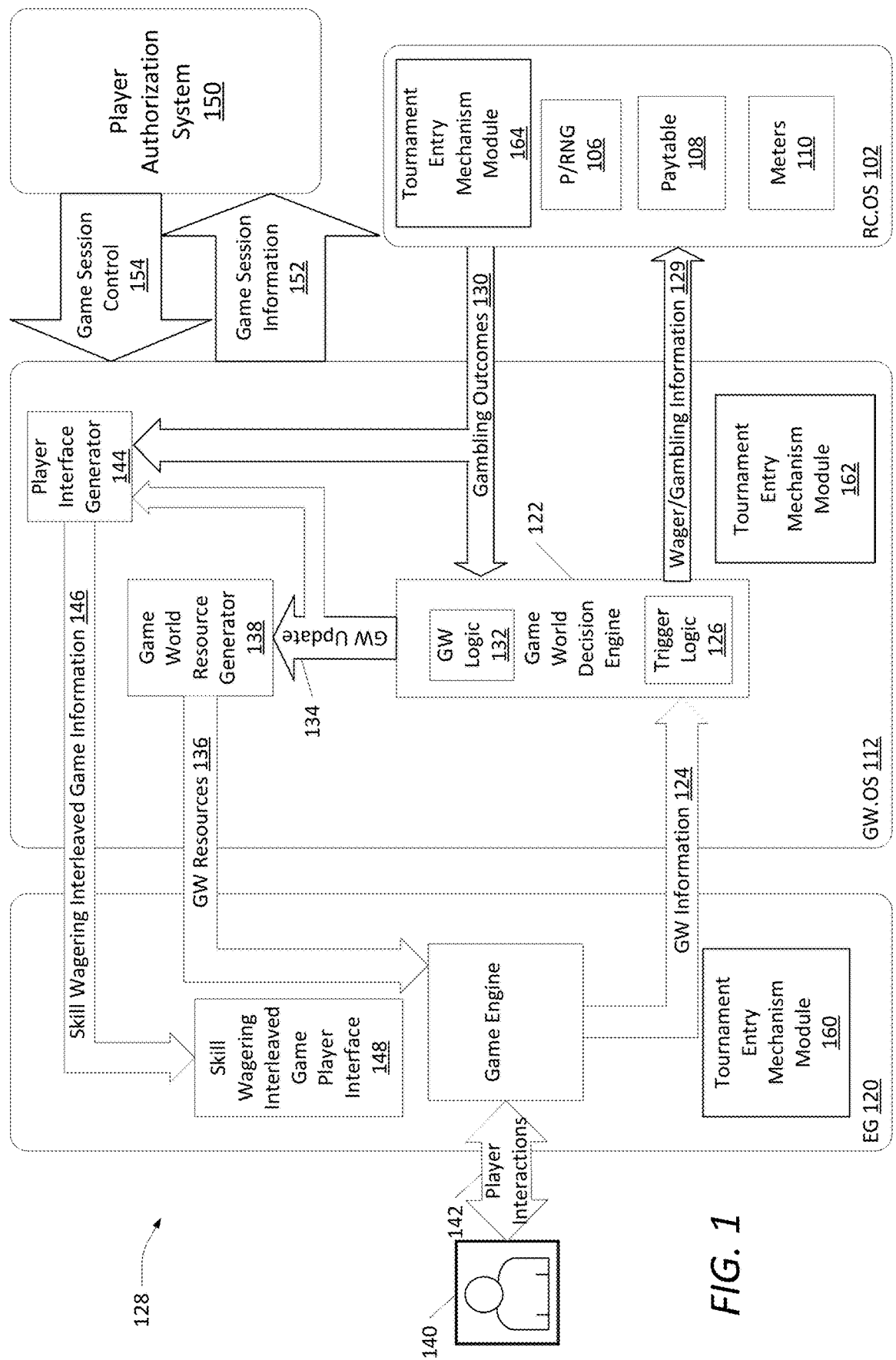
FIG. 1 illustrates a system diagram of a tournament entry mechanism in a skill wagering interleaved game in accordance with an embodiment of the invention.

Turning now to the drawings, systems and methods for operation of a tournament entry mechanism in a skill wagering interleaved games are illustrated. In several embodiments, a tournament entry mechanism in a skill wagering interleaved game is a form of a combined skill and wagering game that integrates both a gambling game and a skill-based entertainment game. The gambling game is provided by a real credit operating system (RC.OS) which manages the gambling game. An entertainment game system (EG) executes the skill-based components of the tournament entry mechanism in a skill wagering interleaved game entertainment game for user entertainment. The EG is coupled to the RC.OS by a game world operating system (GW.OS). The GW.OS manages the configuration of the tournament entry mechanism in a skill wagering interleaved game entertainment game. In certain embodiments, the tournament entry mechanism in a skill wagering interleaved game also includes a player interface that is associated with either or both RC.OS providing the gambling game and the EG providing the entertainment game. For purposes of the discussion, a player or player interactions are represented in a tournament entry mechanism in a skill wagering interleaved game by the electronic representation of interactions between the player and the game, typically received via the player interface, and a player profile of the tournament entry mechanism in a skill wagering interleaved game associated with the player.

In operation of a tournament entry mechanism in a skill wagering interleaved game, a player acts upon various types of elements of the entertainment game in a game world environment. Elements are game world resources consumed within an entertainment game to advance entertainment game gameplay. During gameplay of the entertainment game using the elements, a player can optionally consume and/or accrue game world credits (GWC) within the entertainment game. These GWC credits can be in the form of, but are not limited to, game world credits, experience points, and points generally. Wagers can be made on the outcome of gambling events in the gambling game as triggered by the player's utilization of one or more elements of the entertainment game. The wagers may be made using real world credits (RC). The real world credits can be credits in an actual currency, or can be credits in a virtual currency which may or may not have a real world value. The outcomes of gambling events in the gambling game can cause consumption, loss or accrual of RC. In accordance with some embodiments, the outcomes of gambling events in the gambling game can influence game world resources and/or elements in the entertainment game such as, but not limited to, providing a game world resource, restoring a consumed element; causing the loss of an element, and restoration or placement of a fixed element.

In many embodiments, the gambling games can facilitate a wager of GWC for a randomly generated payout of entertainment game resources such as, but not limited to, GWC and game world elements, on the outcome of a gambling event in a gambling game. The payout for a wager of entertainment game GWC or elements may include a randomly generated payout of additional GWC or elements in accordance with some embodiments. In a number of embodiments, an amount of GWC and/or elements used as part of a wager can have a RC value if cashed out during and/or at the end of a tournament entry mechanism in a skill wagering interleaved game gameplay session.

Example elements of elements in an entertainment game include enabling elements (EE) that are game world resources utilized during a player's skillful play of the entertainment game and whose consumption by the player while playing the entertainment game triggers a wager of RC in a gambling game. Another, non-limiting, example of an element in an entertainment game is a reserve enabling element (REE), which is an element that converts into one or more enabling elements upon occurrence of a release event during skill wagering interleaved game gameplay. Yet another, non-limiting, example of element of an entertainment game is an actionable element (AE) which is an element that is acted upon during gameplay of the entertainment game to trigger a wager in the gambling game; and may or may not be restorable during normal play of the entertainment game. Still another, non-limiting, example of an element in an entertainment game is a common enabling element (CEE) which is an element that may be shared by two or more players and causes a gambling event and associated wager to be triggered in the gambling game when used by one of the players during play of the entertainment game. In progressing through entertainment game gameplay, elements can be utilized by a player during interactions with a controlled entity (CE). A CE is a character, entity, inanimate object, device or other object under control of a player.

In accordance with some embodiments of a tournament entry mechanism in a skill wagering interleaved game, as gameplay of the entertainment progresses triggering gambling events and associated wagers on the outcome of the gambling event in the gambling game. The triggering of the gambling event and/or wager can be dependent upon a game world variable such as, but not limited to: a required game object (RGO), a required environmental condition (REC), or a controlled entity characteristic (CEC). A RGO is a specific game object in an entertainment game acted upon for an AE to be completed. A non-limiting example of an RGO is a specific key needed to open a door. A REC is a game state present within an entertainment game for an AE to be completed. A non-limiting example of an REC is daylight whose presence enables a character to walk through woods. A CEC is a status of the CE within an entertainment game for an AE to be completed. A non-limiting example of a CEC is requirement that a CE have full health points before entering battle. Although various gameplay resources such as, but not limited to, GWC, RC and elements as discussed above may be used to trigger a gambling event and/or wager in a gambling game, one skilled in the art will recognize that any gameplay resource can be utilized to advance a tournament entry mechanism in a skill wagering interleaved game gameplay as well as form the basis for a trigger of a wager as appropriate to the specification of a specific application in accordance with various embodiments of the invention. Various skill wagering interleaved games are discussed in Patent Cooperation Treaty Application No. PCT/US11/26768, filed Mar. 1, 2011, entitled ENRICHED GAME PLAY ENVIRONMENT (SINGLE and/or MULTI-PLAYER) FOR CASINO APPLICATIONS, now U.S. Pat. No. 8,632,395 issued Jan. 21, 2014, and Patent Cooperation Treaty Application No. PCT/US11/63587, filed Dec. 6, 2011, entitled ENHANCED SLOT-MACHINE FOR CASINO APPLICATIONS and published as US Patent Application Publication No. 2013/0296021 A1, each disclosure of which is hereby incorporated by reference in its entirety.

In many embodiments, a tournament entry mechanism in a skill wagering interleaved game integrates an entertainment game with a gambling game. In several embodiments, a tournament entry mechanism in a skill wagering interleaved game can utilize a GW.OS to monitor gameplay of the entertainment game executed by an EG for a trigger of a gambling event. The trigger for gambling event can be detected from the skillful execution of the entertainment game in accordance with at least one gambling event occurrence rule. The trigger of the gambling event can be communicated to a RC.OS. In response to notification of the trigger, the RC.OS triggers a gambling event and a RC wager on the outcome of the gambling event that is made in accordance with a wager trigger rule within the gambling game executed by the RC.OS. The wager can produce a wager payout as a randomly generated payout of both RC and gameplay resources. In addition, gameplay of an entertainment game in a tournament entry mechanism in a skill wagering interleaved game can be modified by the GW.OS upon the wager payout. In various embodiments, entertainment game gameplay can advance through the performance of skill wagering interleaved game player actions. For purposes of this discussion a game player action is an action during skill wagering interleaved game gameplay that can be performed by a player or to a player.

In several embodiments, a gambling event occurrence can be determined from one or more game world variables within an entertainment game that are used to trigger a gambling event and/or associated wager in a gambling game. Game world variables can include, but are not limited to, passage of a period of time during skill wagering interleaved game entertainment game gameplay; a result from a tournament entry mechanism in a skill wagering interleaved game entertainment game gameplay session (such as, but not limited to, achieving a goal or a particular score); a player action that is a consumption of an element; or a player action that achieves a combination of elements to be associated with a player profile.

In numerous embodiments, an entertainment game modification is an instruction of how to modify entertainment game gameplay resources based upon one or more of a gambling game payout and game world variables. An entertainment game modification can modify any aspect of a tournament entry mechanism in a skill wagering interleaved game entertainment game, such as but is not limited to an addition of a period of time available for a current gameplay session for the entertainment game of a skill wagering interleaved game, an addition of a period of time available for a future skill wagering interleaved game with tournament entry mechanism entertainment game gameplay session or any other modification to entertainment game elements that can be utilized during entertainment game gameplay. In some embodiments, an entertainment game modification can modify a type of element whose consumption triggers a gambling event occurrence. In many embodiments, an entertainment game modification can modify a type of element whose consumption is not required in a gambling event occurrence.

In a number of embodiments, a player interface can be utilized that depicts a status of entertainment game in the adapted skill wagering interleaved game. A player interface can depict any aspect of an entertainment game including, but not limited to, an illustration of skill wagering interleaved game with tournament entry mechanism entertainment game gameplay advancement as a player plays the adapted skill wagering interleaved game.

In some embodiments, tournament "tickets" may be obtained during gameplay of the entertainment game and used to gain tournament entry. In many embodiments, tournament tickets are virtual tickets that can be stored on a player tracking card or in a network-based player tracking system where the tournament ticket is attributed to a specific player.

One or more tickets may be required to gain entry into a particular tournament and different tournaments may specify different sets of ticket requirements. Furthermore, tickets may be of a single species or of different species. In some embodiments, various combinations of ticket species and amounts may be required in order to gain entry into the same tournament. In some embodiments, the player account provides a "virtual wallet" that accumulates tournament tickets based on a player's gameplay of the entertainment game. In some embodiments, the tickets may be accumulated across multiple sessions of gameplay in the entertainment game while in other embodiments, the tickets may only be accumulated for only a single session of gameplay. In some embodiments, the tickets may set forth various requirements, including expiration dates, trade-in values, transferability, and various other characteristics. A player may use the tickets for entry into tournaments by satisfying the ticket requirements of the various tournaments. In some embodiments, a player may accumulate tickets through the skillful gameplay of the entertainment game. In several embodiments, the tickets may be acquired through a combination of skillful gameplay and/or randomly provided to a player during the gameplay of the entertainment game.

Tournament Entry Mechanism in a Skill Wagering Interleaved Games

In many embodiments, a tournament entry mechanism in a skill wagering interleaved game integrates high-levels of entertainment content from an entertainment game (game of skill) and a gambling experience from a game of chance (gambling game). A tournament entry mechanism in a skill wagering interleaved game provides for random gambling game outcomes that are independent of player skill while providing a gaming experience (as measured by obstacles/challenges encountered, time of play and other factors) shaped by the player's skill. A tournament entry mechanism in a skill wagering interleaved game in accordance with an embodiment of the invention is illustrated in FIG. 1. The tournament entry mechanism in a skill wagering interleaved game 128 includes an RC.OS 102, and a GW.OS 112, and an EG 120. The RC.OS 102 is connected with the GW.OS 112. The EG 120 is also connected with the GW.OS 112.

In several embodiments, the RC.OS 102 is the operating system for one or more gambling games provided by the skill wagering interleaved game 128 and controls and operates the gambling games. The operation of a gambling game is funded by RC such as money or other real world funds. A gambling game can increase or decrease an amount of RC based on random gambling game outcomes, where the gambling proposition of a gambling game is typically regulated by gaming control bodies. In many embodiments, the RC.OS 102 includes a, pseudo random or random number generator (P/RNG) 106; one or more real-world credit pay tables 108; RC meters 110; and other software constructs that enable a game of chance to offer a fair and transparent gambling proposition, and the auditable systems and functions that can enable the game to obtain gaming regulatory body approval.

P/RNG 106 includes software and/or hardware performing processes that can generate random or pseudo random outcomes. The one or more pay tables 108 are tables that can be used in conjunction with P/RNG 106 to determine an amount of real world credits (RC) earned as a function of skill wagering interleaved game gameplay and are analogous to the pay tables used in a conventional slot machine. There can be one or more pay tables 108 in the RC.OS 102. The pay tables 108 are used to implement one or more gambling games. The selection of the pay table 108 to use to resolve a gambling event and/or wager can be based on factors including, but not limited to, game progress a player has earned and/or the eligibility of the player for bonus rounds. Real world credits (RC) are credits analogous to slot machine game credits which are entered into a skill wagering interleaved game by the user either in the form of money such as hard currency or electronic funds. RCs can be decremented and/or augmented based on the outcome of the P/RNG 106 according to a pay table 108 independent of player skill. In certain embodiments, an amount of RC can be used as criteria in order to enter higher levels of the entertainment game provided by the skill wagering interleaved game. In accordance with some embodiments, RC can be carried forward to higher game levels or paid out if a cash out is opted for by a player. The amount of RC used to enter a specific level of the game level n need not be the same for each level.

In many embodiments, the RC.OS includes a tournament entry mechanism module 164 that implements one or more features of a tournament entry mechanism skill wagering interleaved game as described herein.

In many embodiments, the GW.OS 112 manages the overall tournament entry mechanism in a skill wagering interleaved game operation, with the RC.OS 102 and the EG 120 being support units to the GW.OS 112. In several embodiments, the GW.OS 112 may include mechanical, electronic and/or software systems for a tournament entry mechanism in a skill wagering interleaved game entertainment game. The GW.OS 112 provides an interface between tournament entry mechanism in a skill wagering interleaved game entertainment game provided by EG 120 and the tournament entry mechanism in a skill wagering interleaved game gambling game provided by RC.OS 102. The GW.OS 112 includes a game world decision engine 122 that receives game world information 124 from the EG 120. The game world decision engine 122 uses the game world information 124, along with trigger logic 126 to generate gambling and/or wagering information 129 about triggering a gambling event and/or an associated wager of RC in the RC.OS 102. In some embodiments, the game world information 124 includes, but is not limited to, game world variables from the EG that indicate the state of the EG and the entertainment game that is being played by a player 140, and player actions and interactions 142 between the player and entertainment game provided by the EG 120. The gambling and/or wager information 129 may include, but is not limited to, an amount of RC to be wagered, a trigger of a gambling game, and a selection of a paytable 108 to be used by the gambling game.

In some embodiments, the game world decision engine 122 also receives gambling game outcome information 130 from the RC.OS 102. The decision engine 122 uses the gambling game outcome information 130, in conjunction with the game world information 124 and game world logic 132 to generate game world update information 134 about what kind of game world resources 136 are to be provided to the EG 120. A game world resource generator 138 generates the game world resources 136 based on the game world update information 134 provided by the game world decision engine 122 and transmits the generated resources to the EG 120.

In various embodiments, the game world decision engine 122 also calculates the amount of GWC to award to the player 140 based at least in part on the player's skillful execution of the entertainment game of the skill wagering interleaved game as determined from the game world information 124. In some embodiments, gambling game outcome information 130 may also be used to determine the amount of GWC should be awarded to the player.

In some embodiments, the game world update information 134 and gambling game outcome information 130 are provided to a player interface generator 144. The player interface generator 144 receives the game world update information 134 and gambling game outcome information 130; and generates skill wagering interleaved game information 146 describing the state of the skill wagering interleaved game. In some embodiments, the skill wagering interleaved game information 146 may include, but is not limited to, amounts of GWC amounts earned, lost or accumulated by the player through skillful execution of the entertainment game; and RC amounts won, lost or accumulated as determined from the gambling game outcome information 130 and the RC meters 110.

The GW.OS 112 can further couple to the RC.OS 102 to determine the amount of RC available in the game and other wagering metrics of the gambling game. Thus, the GW.OS 112 may potentially affect the amount of RC in play for participation in the gambling events of a gambling game provided by the RC.OS 102 in some embodiments. The GW.OS 112 may additionally include various audit logs and activity meters. In some embodiments, the GW.OS 112 can also couple to a centralized server for exchanging various data related to the player and the activities of the player during game play of a tournament entry mechanism in a skill wagering interleaved game.

In some embodiments, the GW.OS 112 couples to the EG 120 to manage the entertainment game provided. In several embodiments, game world credits (GWC) are player points earned or depleted as a function of player skill as a function of player performance in the context of the game. GWC may be analogous to the score in a typical video game. A tournament entry mechanism in a skill wagering interleaved game entertainment game can have one or more scoring criteria, embedded within the GW.OS 112 and/or the EG 120 that reflect player performance against the goal(s) of the skill wagering interleaved game entertainment game. In some embodiments, GWC can be carried forward from one level of sponsored gameplay of the entertainment to another level. In many embodiments, GWC can be used within the EG to purchase in-game items, including but not limited to, elements that have particular properties, power ups for existing items, and other item enhancements. In many embodiments, GWC may be used to earn entrance into a sweepstakes drawing; to earn entrance in a tournament with prizes; to score in the tournament; and/or to participate and/or score in any other game event. In many embodiments, GWC can be stored on a player tracking card or in a network-based player tracking system where the GWC is attributed to a specific player.

In some embodiments, the operation of the GW.OS 112 does not affect the provision of the gambling game by the RC.OS 102 except for player choice parameters that are allowable in a gambling game. Examples of player choice parameters include, but not limited to, wager terms such as but not limited to a wager amount; speed of game play (for example, the pressing a button or pulling the handle of a slot machine); and/or agreement to wager into a bonus round. In accordance with these embodiments, the RC.OS 102 provides a fair and transparent, non-skill based gambling proposition co-processor to the GW.OS 112. In the illustrated embodiment, the transfer of gambling game outcome information 130 shown between the GW.OS 112 and the RC.OS 102 allows the GW.OS 112 to obtain information from the RC.OS 102 as to the amount of RC available in the gambling game. In various embodiments, the communication link can also be used to convey a status operation of the RC.OS 102 (such as on-line or tilt). In a number of embodiments, the communication link used to provide the gambling and/or wagering information 129 between the RC.OS 102 and the GW.OS 112 can further be used to communicate the various gambling control factors which the RC.OS 102 uses as input. Examples of gambling control factors include, but are not limited to, the number of RC consumed per gambling event; and/or the player's election to enter a jackpot round. In FIG. 1, the GW.OS 112 is also shown as connecting to the player's player interface 148 directly, as the GW.OS 112 can utilize the player interface 148 to communicate certain skill wagering interleaved game entertainment game information including but not limited to, club points; player status; control of the selection of choices; and messages which a player can find useful in order to adjust the skill wagering interleaved game entertainment game experience or understand the gambling status of the player in the gambling game in the RC.OS 102.

In many embodiments, the GW.OS includes a tournament entry mechanism module 162 that implements one or more features of a tournament entry mechanism skill wagering interleaved game as described herein.

In various embodiments, the EG 120 manages and controls the visual, audio, and player control for the skill wagering interleaved game entertainment game. In certain embodiments, the EG 120 accepts input from a player through a set of hand controls, and/or head, gesture, and/or eye tracking systems and outputs video, audio and/or other sensory output to a player interface. In many embodiments, the EG 120 can exchange data with and accept control information from the GW.OS 112. In several embodiments, the EG 120 can be implemented using a processing device executing a specific entertainment game software program. Examples of processing devices that may implement the EG 120 include, but are not limited to: a mobile computing device such as a smart phone, tablet computer, personal digital assistant or the like; an electronic gaming machine such as a cabinet-based casino game; a personal computer; and a game console such as a Sony PlayStation® (a video game console developed by Sony Computer Entertainment of Tokyo Japan), or a Microsoft Xbox® (a video game console developed by Microsoft Corporation of Redmond, Wash.). In numerous embodiments, the EG 120 can be an electromechanical game system that provides an electromechanical skill wagering interleaved game. An electromechanical skill wagering interleaved game executes an electromechanical entertainment game for player entertainment. The electromechanical entertainment game can be any game that utilizes both mechanical and electrical components, where the game operates as a combination of mechanical motions performed by at least one player or the electromechanical game itself. Various electromechanical skill wagering interleaved games are discussed in Patent Cooperation Treaty Application No. PCT/US12/58156, filed Sep. 29, 2012, now U.S. Pat. No. 8,790,170, issued Jul. 29, 2014, U.S. Pat. No. 8,944,899, issued Feb. 3, 2015, and US Patent Application Publication No. 2015/0141128 A1, the contents of which are hereby incorporated by reference in their entirety.

In the shown embodiment, the EG 120 operates mostly independently from the GW.OS 112. Via the transfer of game world resources 136, however, the GW.OS 112 can send certain skill wagering interleaved game entertainment game resources including control parameters to the EG 120 to affect the EG's execution, such as (but not limited to) changing the difficulty level of the game. In various embodiments, these entertainment game control parameters can be based on a gambling outcome of a gambling game that was triggered by an element in the skill wagering interleaved game entertainment game being acted upon by the player. The EG 120 can accept this input from the GW.OS 112, make adjustments, and continue skill wagering interleaved game entertainment game gameplay all the while running seamlessly from the player's perspective.

The execution of the entertainment game by the EG 120 is mostly skill based, except for where the processes performed by the EG 120 can inject complexities into the game by chance in the normal operation of gameplay to create unpredictability in the skill wagering interleaved game entertainment game. The EG 120 can also communicate player choices made in the game to the GW.OS 112, included in the game world information 124, such as but not limited to the player's utilization of the elements of the entertainment game during the player's skillful execution of the entertainment game. In this architecture, the GW.OS is interfaced to the EG 120 in order to allow the transparent coupling of a tournament entry mechanism in a skill wagering interleaved game entertainment game to a fair and transparent random chance gambling game, providing a seamless perspective to the player that they are playing a typical popular skill wagering interleaved game entertainment game (which is skill based).

In many embodiments, the EG includes tournament entry mechanism module 160 that implements one or more features of a tournament entry mechanism skill wagering interleaved game as described herein.

In several embodiments, the RC.OS 102 can accept a trigger to resolve a gambling event in a gambling game in response to actions taken by the player in the skill wagering interleaved game entertainment game as conveyed by the EG 120 to the GW.OS 112. The GW.OS 112 triggers the gambling event in the gambling game using trigger logic 126, and the RC.OS 102 resolves the gambling event in the background of the overall skill wagering interleaved game from the player's perspective and provide information about the outcome of the gambling event to the GW.OS 112 to expose the player to certain aspects of the gambling game. Examples of aspects of the gambling game that may be exposed to the player include, but are not limited to, odds of certain outcomes, amount of RC in play, and amount of RC available. In a number of embodiments, the RC.OS 102 can accept modifications in the amount of RC wagered on each individual gambling event, in the number of gambling events per minute the RC.OS 102 can resolve entrance into a bonus round, and other factors. One skilled in the art will note that these factors can take a different form than that of a typical slot machine. An example of a varying wager amount that the player can choose can include, but is not limited to, gameplay using a more difficult entertainment game level. These factors can increase or decrease the amount wagered per individual gambling game in the same manner that a standard slot machine player can decide to wager more or less credits for each pull of the handle. In several embodiments, the RC.OS 102 can communicate a number of factors back and forth to the GW.OS 112, via an interface, such that an increase/decrease in a wagered amount can be related to the change in player profile of the player in the skill wagering interleaved game entertainment game. In this manner, a player can control a wager amount per gambling event in the gambling game with the change mapping to a parameter or component that is applicable to the skill wagering interleaved game entertainment game experience.

In many embodiments, a tournament entry mechanism in a skill wagering interleaved game integrates a video game style gambling game provided by a gambling machine where the gambling game (including an RC.OS 102 and RC) may not be player skill based. In some embodiments, the gambling game may allow players to use their skills to earn club points which a casino operator can translate into rewards including, but not limited to, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established within the entertainment game. In several embodiments, the skill wagering interleaved game can leverage entertainment game titles popular with gamers and provide a sea change in a casino environment to attract players with games that are more akin to the type of entertainment that a younger generation desires. In various embodiments, players can use their skill in the entertainment game towards building and banking GWC. The GWC may then by be used to win tournaments and various prizes as a function of skills of the gamer. In a number of embodiments, the skill wagering interleaved game minimizes the underlying changes applied to the aforementioned entertainment software for the skill wagering interleaved game to operate within a tournament entry mechanism in a skill wagering interleaved game entertainment game construct. Therefore, a plethora of complex game titles and environments can be rapidly and may be inexpensively deployed in a gambling environment.

In certain embodiments, skill wagering interleaved games also allow players to gain entry into subsequent competitions through the accumulation of game world credits (GWC) as a function of the users demonstrated skill at the game. These competitions can pit individual players or groups of players against one another and/or against the operator of a gambling game (such as but not limited to a casino) to win prizes based upon a combination of chance and skill. These competitions can be asynchronous events whereby players participate at a time and/or place of their choosing or synchronized events whereby players participate at a specific time and/or venue.

In many embodiments, one or more players can be engaged in playing a skill based skill wagering interleaved game with tournament entry mechanism entertainment game executed by the EG 120. In various embodiments, a tournament entry mechanism in a skill wagering interleaved game can include an entertainment game that includes head to head play between a single player and the computer; between two or more players against one another; or multiple players playing against the computer and/or each other as well as a process by which a player can bet on the outcome of a tournament entry mechanism in a skill wagering interleaved game entertainment game. In some embodiments, the skill wagering interleaved game with tournament entry mechanism entertainment game can be a game where the player is not playing against the computer or any other player such as games where the player is effectively playing against himself or herself.

In some embodiments, a player authorization system 150 is used to authorize a SWig gaming session. The player authorization system receives game session information 152, that may include, but is not limited to, player, Eg, GW.OS and RC.OS information from the GW.OS 112. The player authorization system uses the player, Eg, GW.OS and RC.OS information to regulate a SWig gaming session. In some embodiments, the player authorization system may also assert control of a SWig game session 154. Such control may include, but is not limited to, ending a SWig game session, initiating gambling in a SWig game session, ending gambling in SWig game session but not ending a player's play of the entertainment game portion of the SWig game, and changing from real currency wagering in a SWig to virtual currency wagering, or vice versa.

Figure 2:
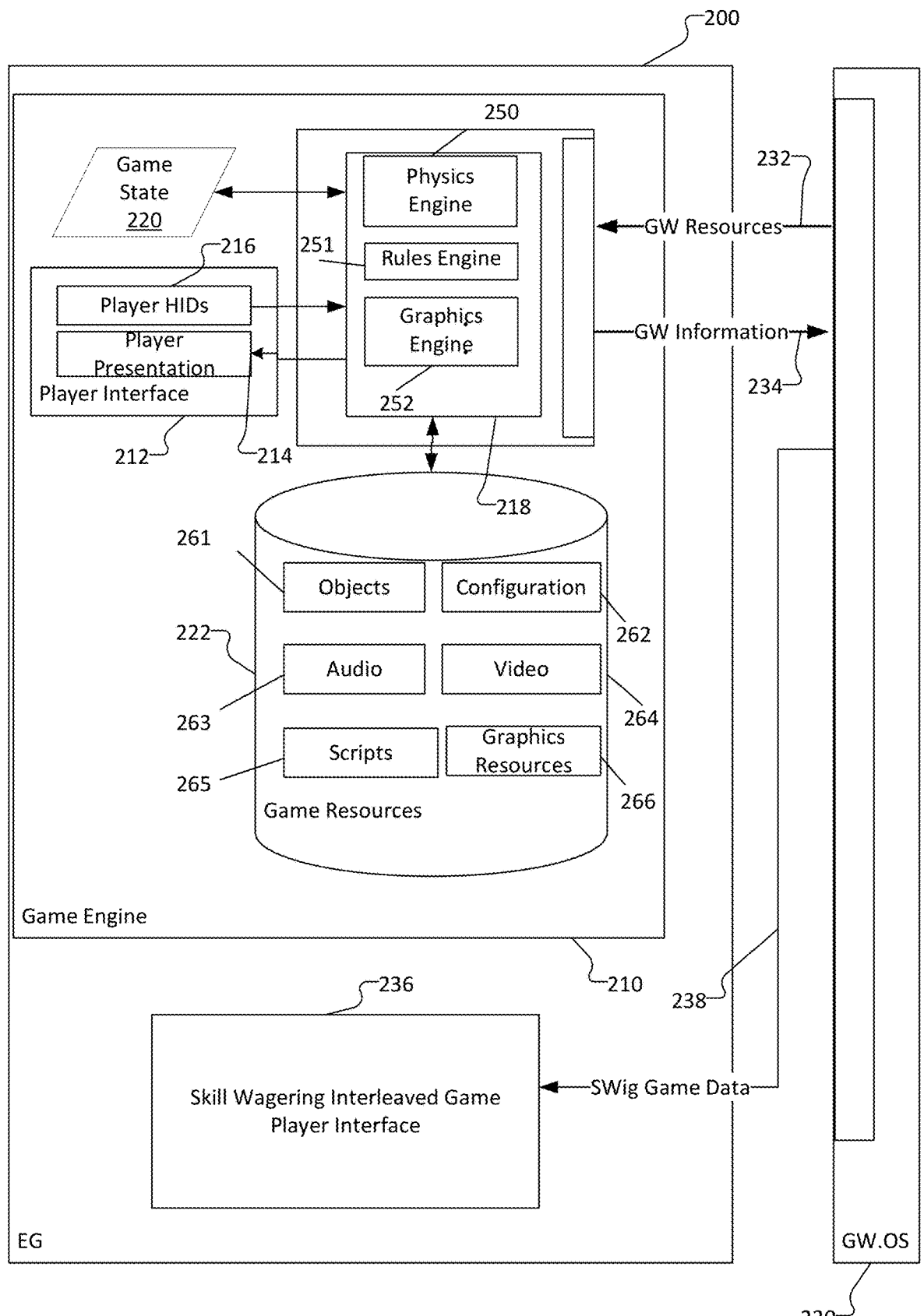
FIG. 2 illustrates a block diagram of components of an entertainment game in accordance with an embodiment of the invention.

The components of an EG in accordance with an embodiment of the invention are shown in FIG. 2. The EG 200 may be part of the entertainment game system itself, may be a software module that is executed by the entertainment game system, or may provide an execution environment for the entertainment game on a particular host entertainment game system. The EG 200 and an associated entertainment game are hosted by an EG device. The EG device is a computing device that is capable of hosting the EG. Embodiments of devices include, but are not limited to, electronic gaming machines, video game consoles, smart phones, personal computers, tablet computers, or the like. In several embodiments, an EG 200 of a tournament entry mechanism in a skill wagering interleaved game includes a game engine 210 that generates a player interface 212 for interaction with a player. The player interface includes a player presentation 214 that is presented to a player through the player interface. The player presentation may include audio features, visual features or tactile feature, or any combination of these preceding features. The player interface 212 further includes one or more human input devices (HIDs) 216 that the player can use to interact with the adapted skill wagering interleaved game. Various components or sub-engines 218 of the game engine can read data from a game state 220 in order to implement the features of the EG. In some embodiments, components or sub-engines 218 of the game engine 210 can include, but are not limited to, a physics engine 250, a rules engine 251, and/or a graphics engine 252. The physics engine 250 is used to simulate physical interactions between virtual objects in the game state. The rules engine 251 implements the rules of the entertainment game and an RNG that may be used for influencing or determining certain variables and/or outcomes to provide a randomizing influence on game play. The graphics engine 252 is used to generate a visual representation of the game state to the player. Furthermore, the sub-engines 218 may also include an audio engine (Not Shown) to generate audio outputs for the player interface 214.

During operation, the game engine 210 reads and writes game resources 222 stored on a data store of the EG host. The game resources 222 may include game objects 261 having graphics and/or control logic used to implement game world objects of the entertainment game. In various embodiments, the game resources may also include, but are not limited to, video files 264 that are used to generate cut-scenes for the entertainment game; audio files 263 used to generate music, sound effects, etc. within the entertainment game; configuration files 262 used to configure the features of the entertainment game; scripts or other types of control code 265 used to implement various game play features of the entertainment game; and graphics resources 266 such as textures, objects, etc. that are used by the game engine to render objects displayed in an entertainment game.

In operation, components of the game engine 210 read portions of the game state 220 and generate the player presentation 214 for the player which is presented to the player using the player interface 212. The player perceives the presentation and provides player inputs using the HIDs 216. The corresponding player inputs are received as player actions or inputs by various components of the game engine 210. The game engine 210 translates the player actions into interactions with the virtual objects of the game world stored in the game state 220. Components of the game engine use the player interactions with the virtual objects of the entertainment game and the entertainment game state 220 to update the game state 220 and update the presentation 214 presented to the user. The process loops in a game loop continuously while the player plays the adapted skill wagering interleaved game.

The EG 200 provides one or more interfaces between an EG 200 and other components of a tournament entry mechanism in a skill wagering interleaved game, such as a GW.OS 230. The EG 200 and the other skill wagering interleaved game with tournament entry mechanism components communicate with each other using the interfaces. The interface may be used to pass various types of data; and to send and receive messages, status information, commands and the like. In certain embodiments, the EG 200 and GW.OS 230 exchange game world resources 232 and game world information 234. In some embodiments, the communications include requests by the GW.OS 230 that the EG 200 update the game state 220 using information provided by the GW.OS 230. In many embodiments, a communication by the GW.OS 230 requests that the EG 200 update one or more game resources 222 using information provided by the GW.OS 230. In a number of embodiments, the EG 200 provides all or a portion of the game state to GW.OS 230. Is some embodiments, the EG 200 may also provide information about one or more of the game resources 222 to the GW.OS 230. In some embodiments, the communication includes player actions that the EG 200 communicates to the GW.OS 230. The player actions may be low level player interactions with the player interface 212, such as manipulation of an HID, or may be high level interactions with game objects as determined by the entertainment game. The player actions may also include resultant actions such as modifications to the skill wagering interleaved game with tournament entry mechanism state 220 or game resources 222 resulting from the player's actions taken in the adapted skill wagering interleaved entertainment game. In some embodiments, player actions include, but are not limited to, actions taken by entities such as non-payer characters (NPC) of the entertainment game that act on behalf of or under the control of the player.

In some embodiments, the EG 200 includes a tournament entry mechanism in a skill wagering interleaved game player interface 236 used to communicate skill wagering interleaved game with tournament entry mechanism data 238 to and from the player. The communications from skill wagering interleaved game with tournament entry mechanism interface 236 include, but are not limited to, information used by the player to configure gambling game RC wagers, and information about the gambling game RC wagers such as, but not limited to, RC balances and RC amounts wagered.

Figure 3:
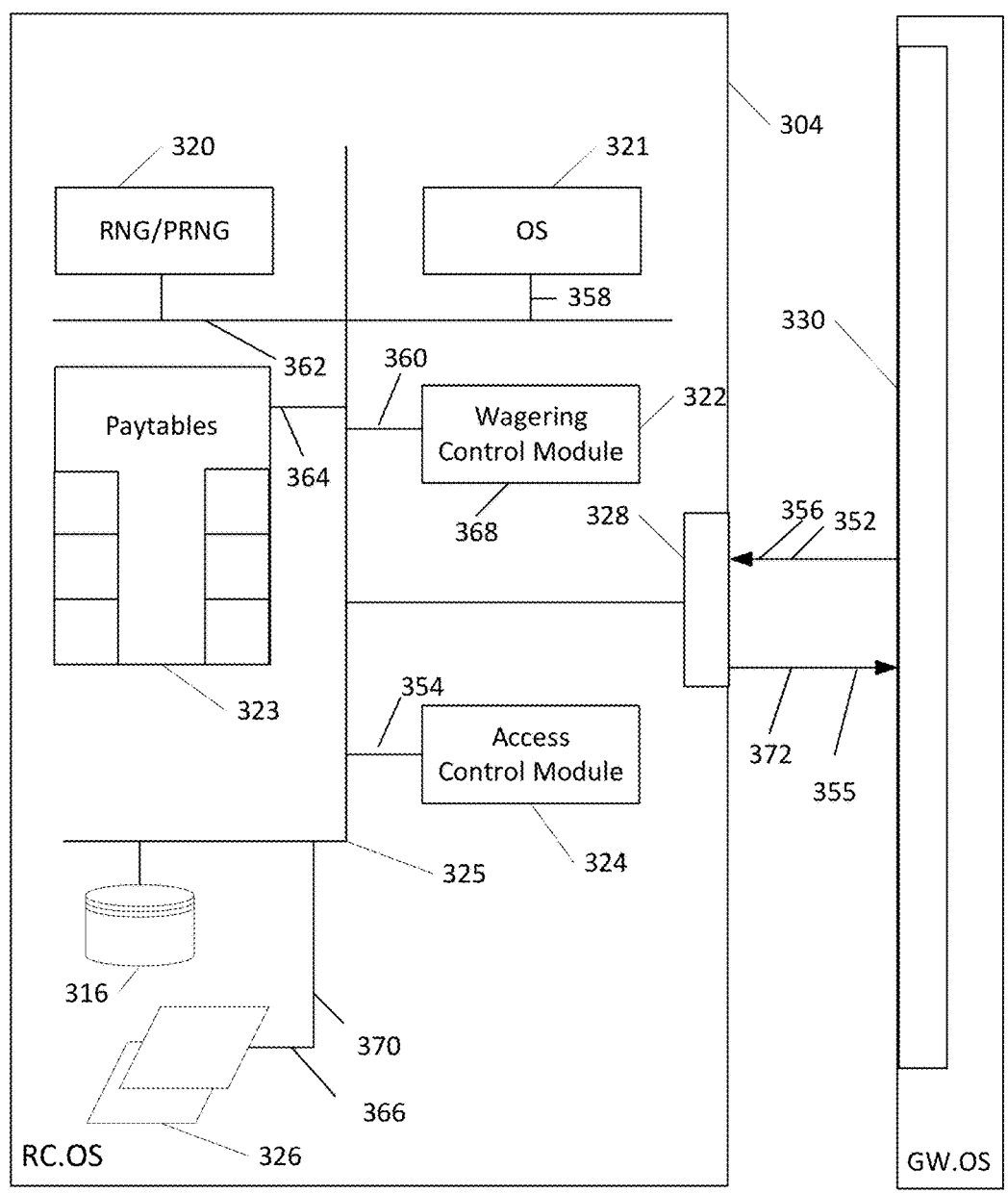
FIG. 3 illustrates a block diagram of components of a real credit operating system in accordance with an embodiment of the invention.

Components of an RC.OS in accordance with an embodiment of the invention are shown in FIG. 3. The RC.OS 304 has an operating system OS 321 which controls the functions of the RC.OS 304; a random number generator (RNG) 320 to produce random numbers or pseudo random numbers; one or more pay tables 323 which includes a plurality of factors indexed by the random number to be multiplied with an amount of RC committed in a wager; and a wagering control module 322 whose processes may include, but are not limited to, pulling random numbers, looking up factors in the pay tables, multiplying the factors by an amount of RC wagered, and administering one or more RC credit meters 326. The RC.OS 304 may also include storage for statuses, wagers, wager outcomes, meters and other historical events in a storage device 316. An authorization access module 324 provides a process to permit access and command exchange with the RC.OS 304 and access to a repository (a credit meter) 326 for the amount of RC which player has deposited in the adapted skill wagering interleaved game. An external interface 328 allows the RC.OS 304 to interface to another system or device, such as a GW.OS 330. The various RC.OS modules and components can interface with each other via an internal bus 325 and/or other appropriate communication mechanism.

In various embodiments, an RC.OS 304 may use an RNG provided by an external system. The external system may be connected to the RC.OS 304 by a local area network (LAN) or a wide area network (WAN) such as the Internet. In some embodiments, the external RNG is a central deterministic system such as a regulated and controlled random numbered ball selection device or some other system that provides random or pseudo random numbers to one or more connected RC.OSs. In numerous embodiments, the interface between the RC.OS 304 and other systems/devices including an external RNG may be the Internet. However, other methods of communication may be used including, but not limited to, a LAN, a USB interface, and/or some other method by which two electronic devices could communicate with each other.

In numerous embodiments, signaling occurs between various components of an RC.OS 304 and an external system, such as GW.OS 330. In some of these embodiments, the purpose of the RC.OS 304 is to manage wagering on gambling events and to provide random (or pseudo random) numbers from an RNG. The external system requesting wagering support instructs the RC.OS 304 as to the pay table 328 to use and/or the amount of RC to wager. Next, the external system signals the RC.OS 304 to trigger a gambling event with an associated wager on the results of the gambling event wager. The RC.OS 304 resolves the gambling event and determines the outcomes of the wager. The RC.OS can then inform the external system as to the outcome of the wager (the amount of RC won,) and/or the amount of RC in the player's account in the credit repository.

In various embodiments, a second communication exchange between the RC.OS 304 and an external system relates to the external system using an RNG result support from the RC.OS 304. In this exchange, the external system requests an RNG result from the RC.OS 304. In response, the RC.OS 304 returns an RNG result as a function of an internal RNG or an RNG external to the RC.OS 304 to which the RC.OS 304 is connected.

In some embodiments, a communication exchange between the RC.OS 304 and an external system relate to the external system support for coupling an RNG result to a particular pay table contained in the RC.OS 304. In such an exchange, the external system instructs the RC.OS 304 as to the pay table 323 to use, and requests a result whereby the RNG result would be coupled to the requested pay table 323. The result of the coupling is returned to the external system. In such an exchange, no actual RC wager is conducted, but might be useful in coupling certain non-RC wagering entertainment game behaviors and propositions to the same final resultant wagering return which is understood for the skill wagering interleaved game with tournament entry mechanism to conduct wagering. In a number of embodiments, some or all of the various commands and responses discussed above can be combined into one or more communication packets.

The RC.OS 304 operates in the following manner in accordance with some embodiments of the invention. The process begins by a RC.OS 304 receiving signals from an external system requesting a connection to RC.OS 304 (352). The request includes credentials for the external system. The Access Authorization Module 324 determines that the external system is authorized to connect to RC.OS 304 (354) and transmits an authorization response to the external system (355). The external systems provide a request for a gambling event to be performed to the RC.OS 304 (356). The request may include an indication of a wager amount on a proposition in the gambling event, and a proper pay table 323 to use to resolve the wager. The external system sends a signal to trigger the gambling event (358).

The OS 321 instructs the Wager Control Module 322 as to the amount of the RC wager and the Pay Table 323 to select as well as to resolve the wager (360). In response to the request to execute the gambling event, the wager control module 222 requests an P/RNG result from the P/RNG 320 (362); retrieves a proper pay table or tables from the pay tables 323 (364); adjusts the RC of the player in the RC repository 326 as instructed (366); applies the P/RNG result to the particular pay table or tables 323 (368); and multiplies the resultant factor from the Pay Table by the amount of RC wagered to determine the result of the wager (368). Wager Control Module 322 then adds the amount of RC won by the wager to the RC repository 326 (370); and provides the outcome of the wager, and the amount of RC in the repository and the RC won to the external system (372). It should be understood that there may be many different embodiments of an RC.OS 304 including embodiments where many modules and components of the RC.OS 304 are located in various servers and locations, so the foregoing is not meant to be exhaustive or all inclusive, but rather provide information on various embodiments of an RC.OS 304.

Figure 4:
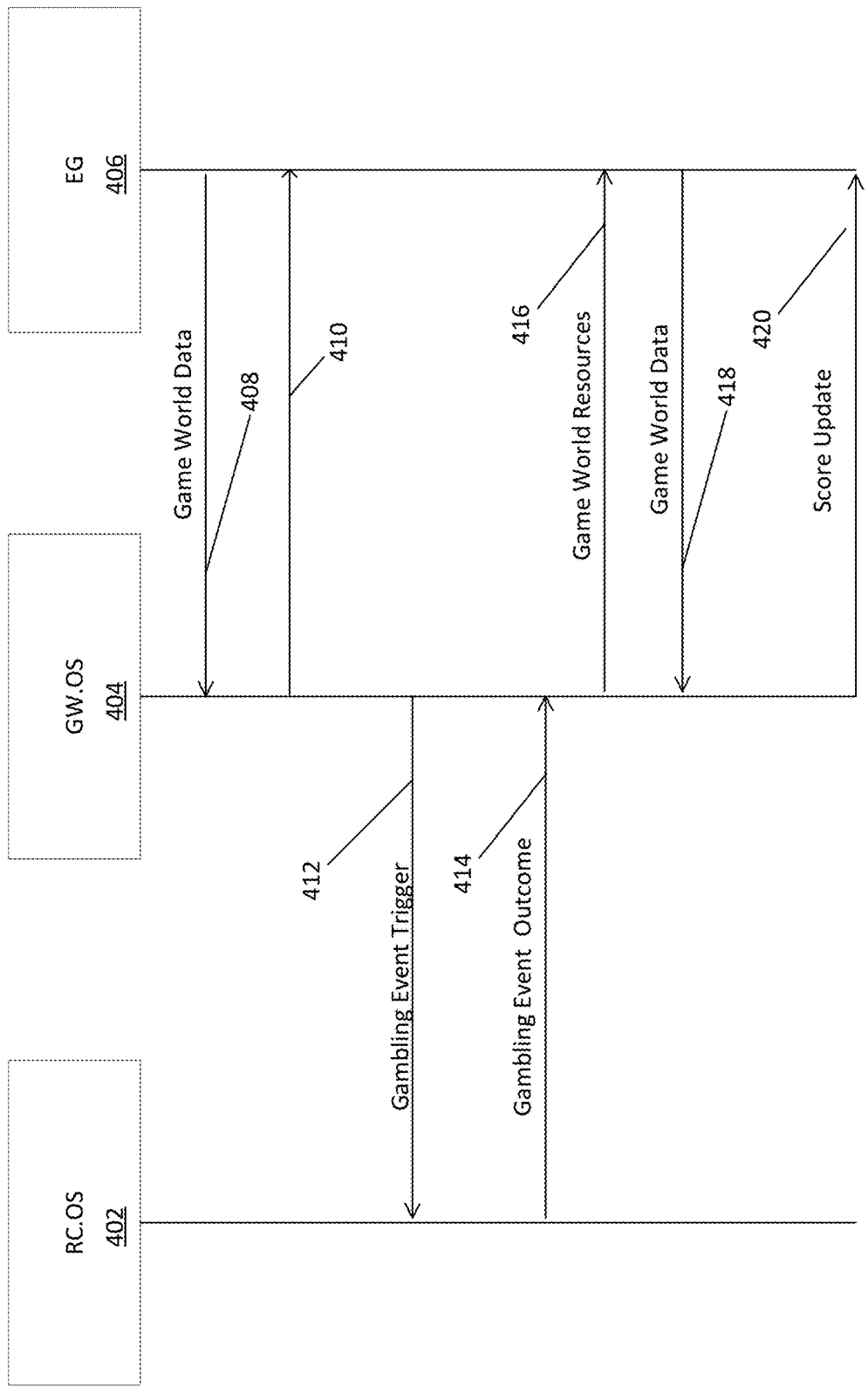
FIG. 4 illustrates a timing diagram of interactions between a tournament entry mechanism in a skill wagering interleaved game entertainment game and real credit operating system of a tournament entry mechanism in a skill wagering interleaved game gambling game, and a Game World Operating System of a tournament entry mechanism in a wagering interleaved game in accordance with an embodiment of the invention.

A timing diagram of a process that facilitates interactions between components of a tournament entry mechanism in a skill wagering interleaved game providing an entertainment game and a gambling game in accordance with an embodiment of the invention is shown in FIG. 4. The components of the skill wagering interleaved game with tournament entry mechanism process include RC.OS 402, GW.OS 404, and EG 406. The process begins with EG 406 detecting a player performing a player action in the entertainment game using a player interface. The EG 406 provides a GW.OS 404 with game world data (408). In some embodiments, the game world data includes but is not limited to, the player interaction detected by the EG 406. In some embodiments, the GW.OS 404 can provide the EG 406 with information as to the amount of EE that will be consumed by the player action in response to receiving the game world data (410). The GW.OS 404 may also provide information to configure a function that controls EE consumption, decay or addition to the EG 406 in response to receiving the game world data. The EG 406 can, based upon the function, consume an amount of EE designated by the GW.OS 404 to couple to the player action. Upon detection that the player action is a gameplay gambling event, the GW.OS 404 can send a request to provide a gambling event to an RC.OS 402 (412). The request for a gambling event may include the wager terms associated with the gameplay gambling event in some embodiments. The RC.OS 402 can consume RC in executing the gambling event and resolving the wager. The RC.OS 402 can return RC as a payout from the wager. The RC.OS 402 can inform (414) the GW.OS 404 as to the outcome of the gambling event and/or any associated wagers. Based on the outcome of the gambling event, the GW.OS 404 can determine game world resources in the entertainment game to award to the player. The GW.OS may provide information about the game world resources award to the EG 406 (416). In some embodiments, the game world resources may be a payout of EE based upon the outcome of the gambling event and/or a wager associated with the gambling event. The EG 406 can reconcile and combine the payout of EE with the EE already ascribed to the player in the skill wagering interleaved game with tournament entry mechanism entertainment game. In various embodiments, the EG 406 can provide an update to the GW.OS 404 as to the updated status of the entertainment game based upon reconciling the payout of EE. The GW.OS 404 may then determine an amount of GWC to award in the entertainment game based upon the updated status and provide the GWC amount to the EG 406 in response to the status update in some embodiments.

The following is an example of the sequence of events in the timing diagram of FIG. 4 in a tournament entry mechanism in a skill wagering interleaved game provides a Sudoku game as the entertainment game in accordance with an embodiment of the invention. In a Sudoku game, a player can take an action, such as selecting a number to be placed in a section of a Sudoku board. The EG 406 provides information about the player action to the GW.OS 404 (408). The information about the player action may include, but is not limited to, the player's choice of a symbol, the position on the Sudoku puzzle board that the symbol is played, and whether or not the symbol as played was a correct symbol in terms of eventually solving the Sudoku puzzle. The GW.OS 404 can process the information concerning the placement of the symbol, and determine that the player action consumes a symbol (EE) with each placement. The GW.OS 404 provides information about the consumption of the symbol to the EG 406 (410). The EG 406 then will consume the EE based upon the placement of the symbol. The GW.OS can also determine that a gambling event is triggered by the placement of the symbol and transmit a request (412) to the RC.OS 402. The request may indicate that 3 credits of RC are to be wagered on the outcome of the gambling event to match the placement of the symbol (EE) that is consumed and indicate a particular pay table (table Ln-RC) that the RC.OS 402 is to use to resolve the wager. The RC.OS 402 can consume the 3 credits for the wager, execute gambling event, and resolve the specified wager. In executing the gambling event and resolving the wager, the RC.OS 402 can determine that the player hits a jackpot of 6 credits and allocate the 6 credits of RC to the credit meter. In other embodiments, any of a variety of credits, pay tables and/or payouts can be utilized in the resolution of gambling events as appropriate to the requirements of specific applications. The RC.OS 402 also provides gambling event outcome information to the GW.OS 404 (414) that informs the GW.OS 404 that 6 credits of RC net were won as a payout from the wager. Based on the gambling event outcome information, the GW.OS 404 can determine that 2 additional symbols are to be made available to the player. The GW.OS 404 provides the game world resources information (416) to the EG 406 informing the EG 406 to add 2 additional symbols (EE) to the set of symbols available to a player based upon the gambling game payout. The EG 406 can then add 2 symbols (EE) to the number of symbol placements available to a player in the Sudoku game. The GW.OS can receive an update (418) from the EG 406 as to the total amount of EE associated with the player. The GW.OS can log the new player score (GWC) in the game (as a function of the successful placement of the symbol) based on the update, and provide a score update (420) the EG to add 2 extra points of GWC to the player's score. Although the above discussion describes the performance of the processes shown in FIG. 4 in the context of a Sudoku entertainment game, similar processes can be utilized to provide other types of entertainment games appropriate to the requirements of specific applications in accordance with embodiments of the invention.

In many embodiments, a player can bet on whether or not the player will beat another player. These bets can be made, for example, on the final outcome of an entertainment game, and/or the state of the entertainment game along various intermediary points (such as but not limited to the score at the end of a period of time of a tournament entry mechanism in a skill wagering interleaved game entertainment game session) and/or on various measures associated with the entertainment game. Players can bet against one another, or engage the computer in a head to head competition in the context of the player's skill level in the skill wagering interleaved game with tournament entry mechanism entertainment game in question. As such, players can have a handicap associated with their player profile that describes their skill in the entertainment game which can be the professed skill of the player in some embodiments. The handicap may be used by a GW.OS to offer appropriate bets around the final and/or intermediate outcomes of the skill wagering interleaved game with tournament entry mechanism entertainment game; to condition sponsored gameplay as a function of player skill; and/or to select players across one or more adapted skill wagering interleaved games to participate in head to head games and/or tournaments.

Many embodiments of the skill wagering interleaved game with tournament entry mechanism enable the maximization of the number of players able to compete competitively by handicapping the players based upon skill in the entertainment game and utilizing a skill normalization module to modify the entertainment game based upon the handicaps of players to even the skill level of players competing against each other. Handicapping enables players of varying performance potential to compete competitively regardless of absolute skill level, such as, but not limited to, where a player whose skill level identifies the player as a beginner can compete in head to head or tournament play against a highly skilled player with meaningful results.

In several embodiments, wagers can be made among numerous adapted skill wagering interleaved games with a global betting manager (GBM). The GBM is a system that coordinates wagers that are made across multiple adapted skill wagering interleaved games by multiple players. In some embodiments, the GBM can also support wagers by third parties relative to the in game performance of other players. The GBM can be a stand-alone system; can be embedded in one of a number of systems including the GW.OS, EG, or any remote server capable of providing services to a tournament entry mechanism in a skill wagering interleaved game; or can operate independently on one or a number of servers on-site at a casino, as part of a larger network and/or the Internet or cloud in general.

Although various components of adapted skill wagering interleaved games are discussed above, adapted skill wagering interleaved games can be configured with any component as appropriate to the specification of a specific application in accordance with embodiments of the invention. In certain embodiments, components of a tournament entry mechanism in a skill wagering interleaved game, such as a GW.OS, RC.OS, and/or EG, can be configured in different ways for a specific skill wagering interleaved game with tournament entry mechanism gameplay application. Stand-alone and network connected adapted skill wagering interleaved games are discussed below.

Stand-Alone Adapted Skill Wagering Interleaved Games

Figure 5A:
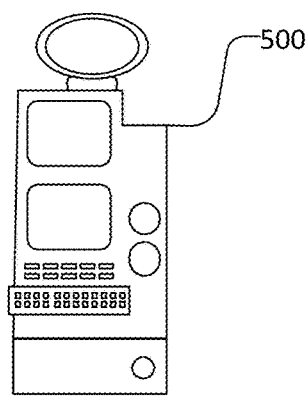
FIGS. 5A, 5B, 5C, and 5D illustrate various devices that host a tournament entry mechanism in a skill wagering interleaved game in accordance with some embodiments of the invention.
Figure 5B:
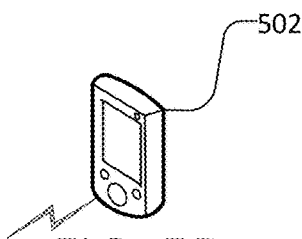
Figure 5C:
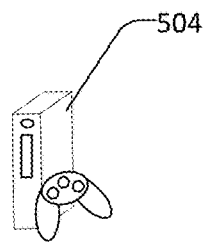
Figure 5D:
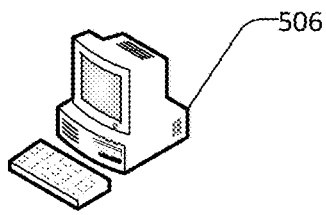

Various types of devices that may be used to host a tournament entry mechanism in a skill wagering interleaved game on a stand-alone device in accordance with various embodiments of the invention are shown in FIGS. 5A to 5D. An electronic gaming machine 500 may be used to host a tournament entry mechanism in a skill wagering interleaved game. The electronic gaming machine 500, shown in FIG. 5A may be physically located in a casino or other gaming establishment. A portable device 502 shown in FIG. 5B is a device that may wirelessly connect to a network and may be used to host a tournament entry mechanism in a skill wagering interleaved game. Examples of portable devices 502 include, but are not limited to, a tablet computer and/or a smartphone. A gaming console 504, shown in FIG. 5C, may also be used to host a tournament entry mechanism in a skill wagering interleaved game. A personal computer 506, shown in FIG. 5D, may also be used to host a tournament entry mechanism in a skill wagering interleaved game in accordance with several embodiments of the invention. Indeed, any device including sufficient processing and/or network communication capabilities can be utilized to host a tournament entry mechanism in a skill wagering interleaved game as appropriate to the requirements of specific applications in accordance with embodiments of the invention.

Network Connected Adapted Skill Wagering Interleaved Games

Some adapted skill wagering interleaved games in accordance with many embodiments of the invention can operate locally while being network connected to draw services from remote locations or to communicate with other adapted skill wagering interleaved games. In many embodiments, operations associated with a tournament entry mechanism in a skill wagering interleaved game utilizing a tournament entry mechanism in a skill wagering interleaved game entertainment game can be performed across multiple devices. These multiple devices can be implemented using a single server or a plurality of servers such that a tournament entry mechanism in a skill wagering interleaved game is executed as a system in a virtualized space such as, but not limited to, where the RC.OS and GW.OS are large scale centralized servers in the cloud coupled to widely distributed EG controllers or clients via the Internet.

In many embodiments, a RC.OS server can perform certain functionalities of a RC.OS of a tournament entry mechanism in a skill wagering interleaved game. In certain embodiments, a RC.OS server includes a centralized odds engine which can generate random outcomes (such as, but not limited to, win/loss outcomes) for gambling events in a gambling game. The RC.OS server can perform a number of simultaneous or pseudo-simultaneous runs in order to generate random outcomes for a variety of odds percentages that one or more networked adapted skill wagering interleaved games can use. In a number of embodiments, an RC.OS of a tournament entry mechanism in a skill wagering interleaved game can send information to a RC.OS server including, but not limited to, paytables, maximum speed of play for a gambling game, gambling game monetary denominations, or any promotional RC provided by the operator of the adapted skill wagering interleaved game. In some specific embodiments, a RC.OS server can send information to a RC.OS of a tournament entry mechanism in a skill wagering interleaved game including, but not limited to, RC used in the gambling game, player profile information, play activity, and/or a profile associated with a player.

In several embodiments, a GW.OS server can perform the functionality of the GW.OS across various adapted skill wagering interleaved games. These functionalities can include, but are not limited to, providing a method for monitoring high scores on select groups of games, coordinating interactions between gameplay layers, linking groups of games in order to join them in head to head tournaments, and acting as a tournament manager.

In a variety of embodiments, management of player profile information can be performed by a patron management server separate from a GW.OS server. A patron management server can manage information related to a player profile. The managed information in the player profile may include, but is not limited to, data concerning controlled entities (characters) in skill wagering interleaved game with tournament entry mechanism entertainment game gameplay; game scores; game elements; RC and GWC associated with a particular players; and tournament reservations. Although a patron management server is discussed separate from a GW.OS server, a GW.OS server also performs the functions of a patron management server in some embodiments. In a number of embodiments, a GW.OS of a tournament entry mechanism in a skill wagering interleaved game can send information to a patron management server. The information sent by the GW.OS to the patron management system may include, but is not limited to, GWC and RC used in a game; player profile information; play activity; profile information for players; synchronization information between a gambling game and a tournament entry mechanism in a skill wagering interleaved game entertainment game; and/or information about other aspects of a tournament entry mechanism in a skill wagering interleaved game. In several embodiments, a patron management server can send patron information to a GW.OS of a tournament entry mechanism in a skill wagering interleaved game. The patron information may include, but is not limited to, skill wagering interleaved game with tournament entry mechanism entertainment game title and type; tournament information; table Ln-GWC tables; special offers; character or profile setup and synchronization information between a gambling game and a tournament entry mechanism in a skill wagering interleaved game entertainment game; and information about any other aspect of a tournament entry mechanism in a skill wagering interleaved game.

In numerous embodiments, an EG server provides a host for managing head to head play operating on a network of EGs connected to the EG server via a network such as the Internet. The EG server provides an environment where players can compete directly with one another and interact with other players. Although an EG server is discussed as separate from a GW.OS server, the functionalities of an EG server and GW.OS server can be combined in a single server in some embodiments.

Servers connected via a network to implement adapted skill wagering interleaved games in accordance with many embodiments of the invention can communicate with each other to provide services utilized by a tournament entry mechanism in a skill wagering interleaved game. In several embodiments, a RC.OS server can communicate with a GW.OS server. In some embodiments, the RC.OS server can communicate with a GW.OS server to communicate any type of information as appropriate for a specific application. Examples of the information that may be communicated include, but are not limited to, information used to configure the various simultaneous or pseudo simultaneous odds engines executing in parallel within the RC.OS to accomplish skill wagering interleaved game with tournament entry mechanism system functionalities; information used to determine metrics of RC.OS performance such as random executions run and/or outcomes for tracking system performance; information used to perform audits and/or provide operator reports; and information used to request the results of a random run win/loss result for use in one or more function(s) operating within the GW.OS such as, but not limited to, automatic drawings for prizes that are a function of EG performance.

In several embodiments, a GW.OS server can communicate with an EG server. A GW.OS server can communicate with an EG server to communicate any type of information as appropriate for a specific application. The information that may be communicated between a GW.OS server and an EG server includes, but is not limited to, the information for management of an EG server by a GW.OS server during a tournament entry mechanism in a skill wagering interleaved game tournament. Typically, a GW.OS (such as a GW.OS that runs within a tournament entry mechanism in a skill wagering interleaved game or on a GW.OS server) is not aware of the relationship of the GW.OS to the rest of a tournament since the actual tournament play is managed by the EG server in a typical configuration. Therefore, management of a tournament entry mechanism in a skill wagering interleaved game tournament can include, but is not limited to tasks including, but not limited to, conducting tournaments according to system programming that can be coordinated by an operator of the adapted skill wagering interleaved game; allowing entry of a particular player into a tournament; communicating the number of players in a tournament; and the status of the tournament (such as, but not limited to the amount of surviving players, the status of each surviving player within the game, and time remaining on the tournament); communicating the performance of players within the tournament; communicating the scores of the various players in the tournament; and providing a synchronizing link to connect the GW.OSs in a tournament with their respective EGs.

In several embodiments, a GW.OS server can communicate with a patron management server. A GW.OS server can communicate with a patron management server to communicate any type of information as appropriate for a specific application. Examples of information communicated between a GW.OS server and a patron management system include, but are not limited to, information for configuring tournaments according to system programming conducted by an operator of a tournament entry mechanism in a skill wagering interleaved game; information for exchange of data used to link a player's player profile to an ability to participate in various forms of skill wagering interleaved game with tournament entry mechanism gameplay (such as but not limited to the difficulty of play set by the GW.OS server or the GW.OS); information for determining a player's ability to participate in a tournament as a function of a player's characteristics (such as but not limited to a player's gaming prowess or other metrics used for tournament screening); information for configuring GW.OS and EG performance to suit preferences of a player on a particular adapted skill wagering interleaved game; and information for determining a player's play and gambling performance for the purposes of marketing intelligence; and information for logging secondary drawing awards, tournament prizes, RC and/or GWC into the player profile.

In many embodiments, the actual location of where various process are executed can be located either in the game contained devices (RC.OS, GW.OS, EG), on the servers (RC.OS server, GW.OS server, or EG server), or a combination of both game contained devices and servers. In a number of embodiments, certain functions of a RC.OS server, GW.OS server, patron management server and/or EG server can operate on the local RC.OS, GW.OS and/or EG contained with a tournament entry mechanism in a skill wagering interleaved game being provided locally on a device. In some embodiments, a server can be part of a server system including multiple servers, where software can be run on one or more physical devices. Similarly, in particular embodiments, multiple servers can be combined on a single physical device.

Figure 6A:
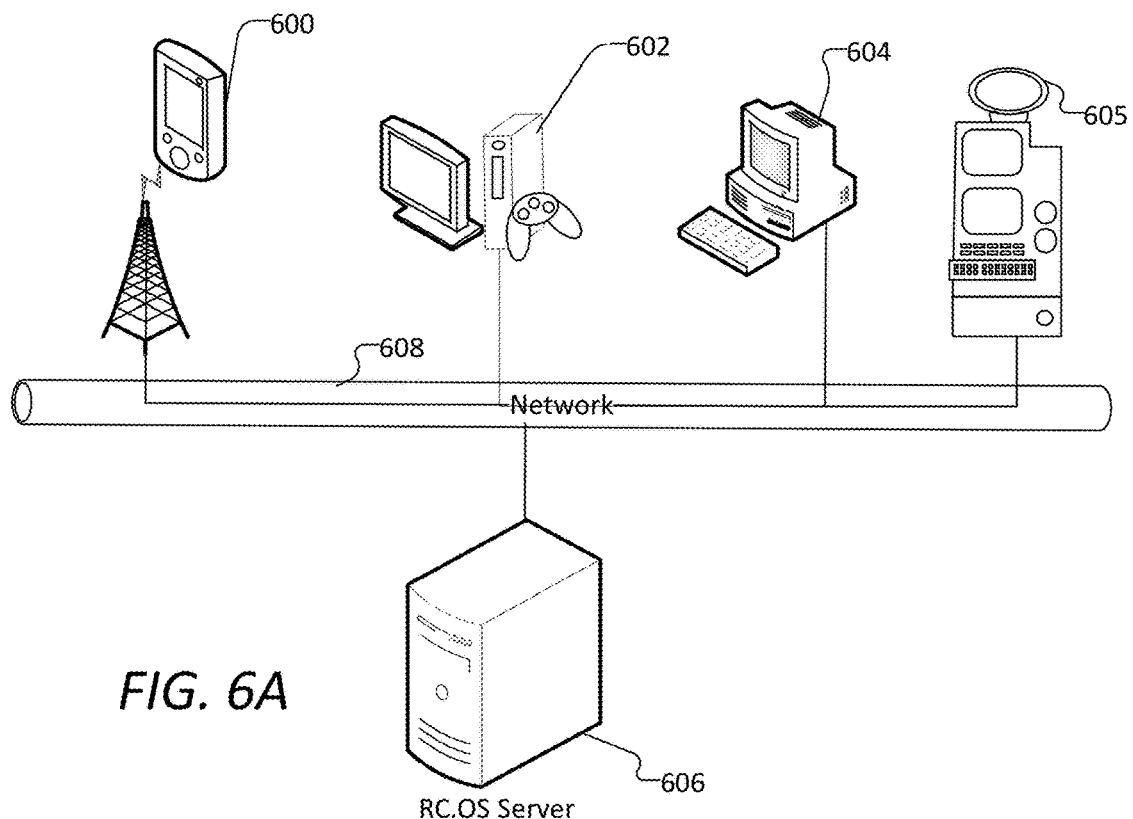
FIGS. 6A, 6B and 6C illustrate embodiments of a distributed skill wagering interleaved game with tournament entry mechanism in accordance with different embodiments of the invention.

Some adapted skill wagering interleaved games in accordance with many embodiments of the invention can be networked with remote servers in various configurations. A networked skill wagering interleaved game with tournament entry mechanism in accordance with an embodiment of the invention is illustrated in FIG. 6A. As illustrated, one or more end devices of networked adapted skill wagering interleaved games such as a mobile device 600, a gaming console 602, a personal computer 604, and an electronic gaming machine 605 are connected with a RC.OS server 606 over a network 608. Network 608 is a communications network that allows processing systems to share data. Examples of the network 608 can include, but are not limited to, a Local Area Network (LAN) and a Wide Area Network (WAN). In some embodiments, the processes of an EG and a GW.OS as described herein are executed on the individual end devices 600, 602, 604 and 605 while the processes of the RC.OS as described herein can be executed by the RC.OS server 606.

Figure 6B:
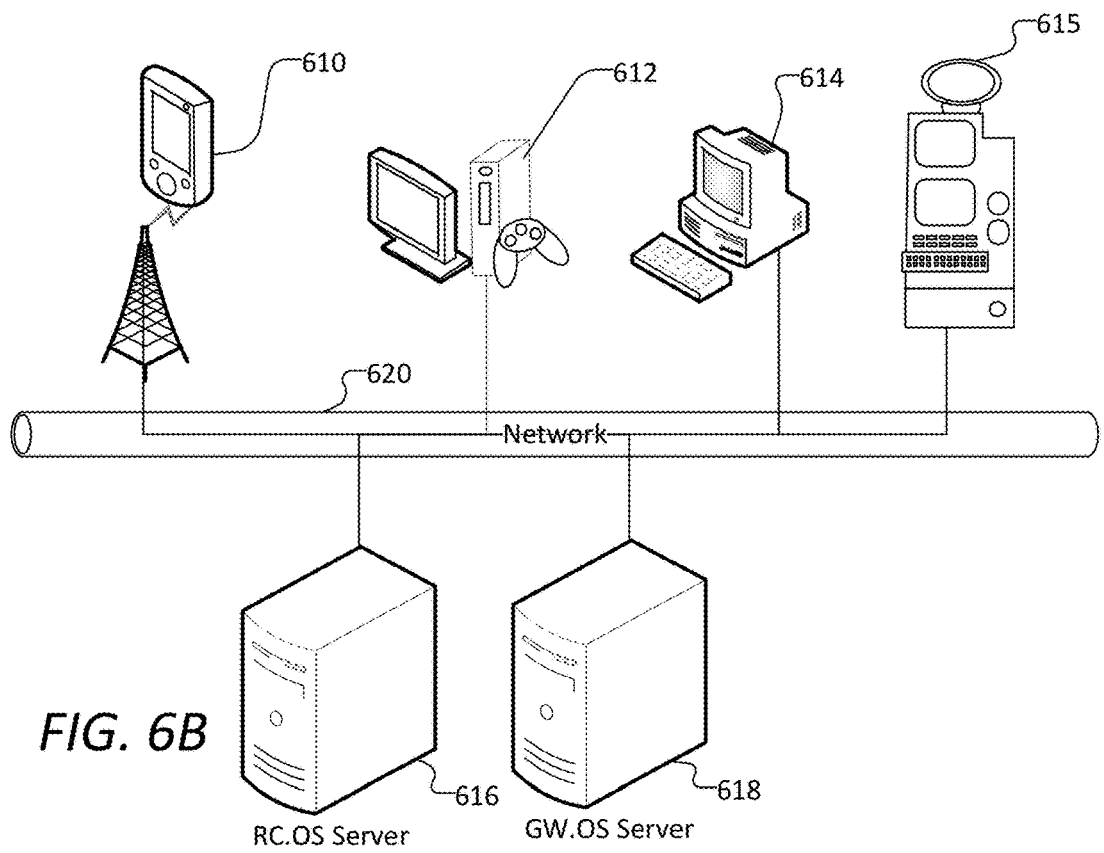

A networked adapted skill wagering interleaved games in accordance with another embodiment of the invention is illustrated in FIG. 6B. As illustrated, one or more end devices of networked adapted skill wagering interleaved games, such as a mobile device 610, a gaming console 612, a personal computer 614, and an electronic gaming machine 615, are connected with an RC.OS server 616 and a GW.OS server 618 over a network 620. Network 620 is a communications network that allows processing systems to share data. Examples of the network 620 can include, but are not limited to, a Local Area Network (LAN) and a Wide Area Network (WAN). In some embodiments, the processes of an EG as described herein are executed on the individual end devices 610, 612, 614 and 615. The processes of the RC.OS as described herein are executed by the RC.OS server 616 and the processes of the GW.OS as described herein are executed by the GW.OS server 618.

Figure 6C:
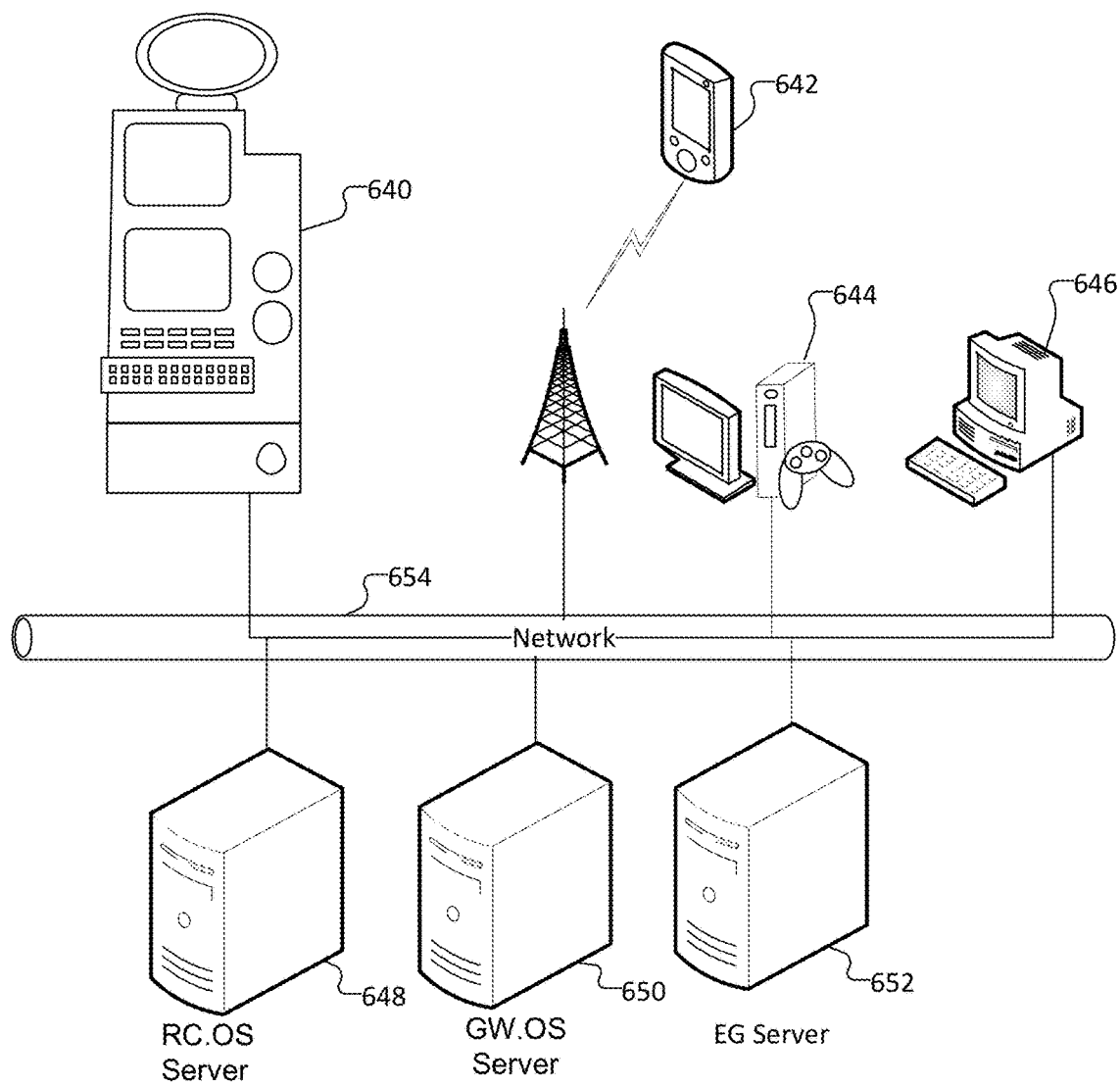

A networked adapted skill wagering interleaved games in accordance with still another embodiment of the invention is illustrated in FIG. 6C. As illustrated, one or more end devices of networked adapted skill wagering interleaved games, such as a mobile device 642, a gaming console 644, a personal computer 646, and an electronic gaming machine 640 are connected with an RC.OS server 648 and a GW.OS server 650, and an EG server 652 over a network 654. Network 654 is a communications network that allows processing systems to share data. Examples of the network 654 can include, but are not limited to, a Local Area Network (LAN) and a Wide Area Network (WAN). In some embodiments, the processes of a display and player interface of an EG as described herein are executed on the individual end devices 640, 642, 644 and 646. The processes of the RC.OS as described herein can be executed by the RC.OS server 648. The processes of the GW.OS as described herein can be executed by the GW.OS server 650 and the processes of an EG excluding the display and player interfaces can be executed by the EG server 652.

In various embodiments, a patron management server may be operatively connected to components of a tournament entry mechanism in a skill wagering interleaved game via a network. In other embodiments, a number of other peripheral systems, such as a player management system, a casino management system, a regulatory system, and/or hosting servers can also interface with the adapted skill wagering interleaved games over a network within a firewall of an operator. Also, other servers can reside outside the bounds of a network within a firewall of the operator to provide additional services for network connected adapted skill wagering interleaved games.

In numerous embodiments, a network distributed skill wagering interleaved game with tournament entry mechanism can be implemented on multiple different types of devices connected together over a network. Any type of device can be utilized in implementing a network distributed skill wagering interleaved game with tournament entry mechanism such as, but not limited to, a gaming cabinet as used in a traditional land-based casino, a mobile computing device (such as, but not limited to a PDA, smartphone, tablet computer, or laptop computer), and a game console (such as but not limited to a Sony PlayStation®, or Microsoft Xbox®) or on a Personal Computer (PC). Each of the devices may be operatively connected to other devices or other systems of devices via a network for the playing of head-to-head games.

Although various networked adapted skill wagering interleaved games are discussed above, adapted skill wagering interleaved games can be networked in any configuration as appropriate to the specification of a specific application in accordance with embodiments of the invention. In some embodiments, components of a networked adapted skill wagering interleaved game, such as a GW.OS, RC.OS, EG, or other servers that perform services for a GW.OS, RC.OS and/or EG, can be networked in different configurations for a specific networked skill wagering interleaved game with tournament entry mechanism gameplay application. Skill wagering interleaved game with tournament entry mechanism implementations are discussed herein. Processing apparatuses that can be utilized in the implementation of skill wagering interleaved game with tournament entry mechanism are discussed below.

Processing Apparatuses

Figure 7:
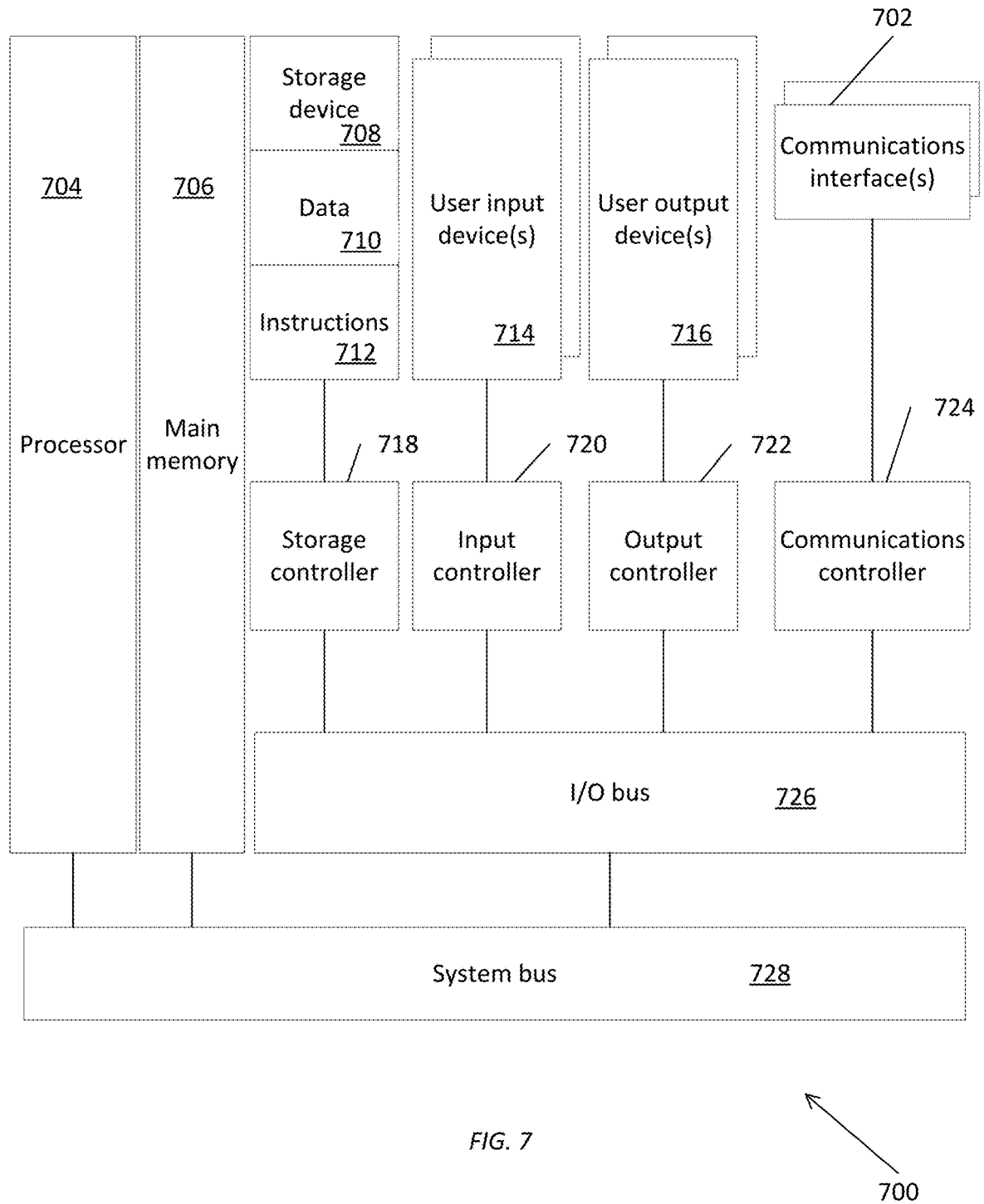
FIG. 7 illustrates a block diagram of components of a processing apparatus configured to provide a tournament entry mechanism in a skill wagering interleaved game in accordance with various embodiments of the invention.

Any of a variety of processing apparatuses can host various components of a tournament entry mechanism in a skill wagering interleaved game in accordance with embodiments of the invention. In accordance with some embodiments of the invention, these processing apparatuses can include, but are not limited to, a server, a client, a mobile device such as a smartphone, a personal digital assistant or the like, a wireless device such as a tablet computer or the like, an electronic gaming machine, a general purpose computer, a gaming console, a set-top box, a computing device and/or a controller. A processing apparatus that is constructed to implement a tournament entry mechanism in a skill wagering interleaved game in accordance with embodiments of the invention is illustrated in FIG. 7. In the processing apparatus 700, a processor 704 is coupled to memory 706 by a system bus 728. The processor 704 is also coupled to non-transitory machine-readable storage media, such as a storage device 708 that stores executable instructions 712 and data 710 through the system bus 728 to an I/O bus 726 through a storage controller 718. The processor 704 is also coupled to one or more interfaces that can be used to connect the processor to other processing apparatuses as well as networks as described herein. The processor 704 is also coupled via the system bus 728 and I/O bus 726 to user input devices 714. Examples of input device 714 include, but are not limited to tactile devices including, but not limited to, keyboards, keypads, foot pads, touch screens, and/or trackballs; as well as non-contact devices such as audio input devices, motion sensors and motion capture devices that the processing apparatus can use to receive inputs from a user when the user interacts with the processing apparatus. The processor 704 is connected to these user input devices 714 through the system bus 728, to the I/O bus 726 and through the input controller 720. The processor 704 is also coupled via the bus to user output devices 716 such as (but not limited to) visual output devices, audio output devices, and/or tactile output devices that the processing apparatus uses to generate outputs perceivable by the user when the user interacts with the processing apparatus. In accordance with some embodiments, the processor 704 is coupled to visual output devices such as (but not limited to) display screens, light panels, and/or lighted displays. In accordance with particular embodiments, the processor 704 is coupled to audio output devices such as (but not limited to) speakers, and/or sound amplifiers. In accordance with many of these embodiments, the processor 704 is coupled to tactile output devices like vibrators, and/or manipulators. The processor 704 is connected to output devices 716 from the system bus 728 to the I/O bus 726 and through the output controller 722. The processor 704 can also be connected to a communications interface 702 from the system bus 728 to the I/O bus 726 through a communications controller 724.

In accordance with various embodiments, a processor 704 can load instructions and data from the storage device into the memory 706. The processor 704 can also execute instructions that operate on the data to implement various aspects and features of the components of a gambling hybrid game. The processor 704 can utilize various input and output devices in accordance with the instructions and the data in order to create and operate user interfaces for players or operators of a tournament entry mechanism in a skill wagering interleaved game (such as but not limited to a casino that hosts the adapted skill wagering interleaved game).

Although the processing apparatus 700 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, the storage device 708 can be accessed by processor 704 through one of the interfaces or over a network. Furthermore, any of the user input devices or user output devices can be coupled to the processor 704 via one of the interfaces or over a network. In addition, although a single processor 704 is described, those skilled in the art will understand that the processor 704 can be a controller or other computing device or a separate computer as well as be composed of multiple processors or computing devices including one or more processors.

In numerous embodiments, any of an RC.OS, GW.OS or EG as described herein can be implemented on multiple processing apparatuses, whether dedicated, shared, or distributed in any combination thereof, or can be implemented on a single processing apparatus. In addition, while certain aspects and features of skill wagering interleaved game with tournament entry mechanism processes described herein have been attributed to an RC.OS, GW.OS, or EG, these aspects and features can be implemented in a distributed form where any of the features or aspects can be performed by any of a RC.OS, GW.OS, and/or EG within a tournament entry mechanism in a skill wagering interleaved game without deviating from the spirit of the invention.

Tournament Entry Mechanism in Skill Wagering Interleaved Game Implementations

Figure 8:
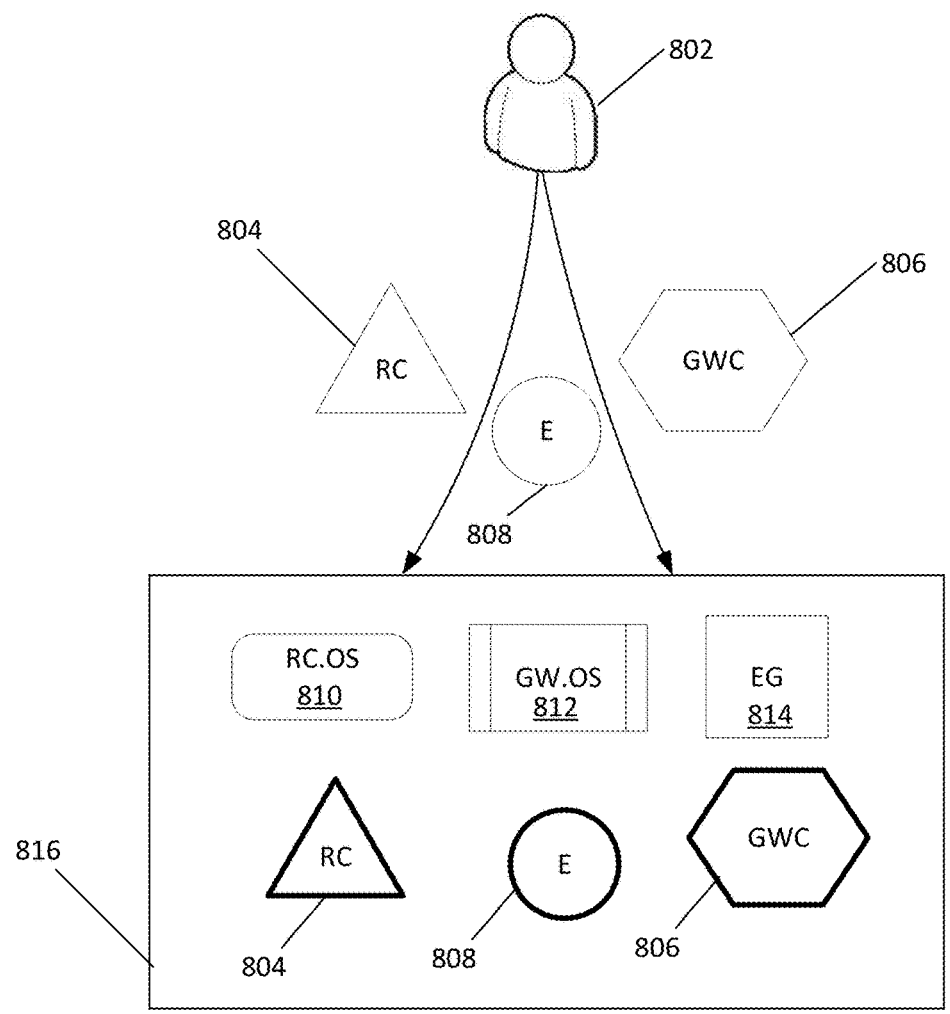
FIG. 8 illustrates a conceptual diagram of components of a tournament entry mechanism in a skill wagering interleaved game in accordance with an embodiment of the invention.

In several embodiments, a player can interact with a tournament entry mechanism in a skill wagering interleaved game by using RC in interactions with a gambling game along with GWC and elements in interactions with a tournament entry mechanism in a skill wagering interleaved game entertainment game. The gambling game can be executed by a RC.OS while a tournament entry mechanism in a skill wagering interleaved game entertainment game can be executed with an EG and managed with a GW.OS. A conceptual diagram that illustrates how resources such as GWC, RC and elements, such as but not limited to EE, are utilized in a tournament entry mechanism in a skill wagering interleaved game in accordance with an embodiment of the invention is illustrated in FIG. 8. The conceptual diagram illustrates that real world credits RC 804, game world elements 808 and game world credit GWC 806 can be utilized by a player 802 in interactions with the RC.OS 810, GW.OS 812 and EG 814 of a tournament entry mechanism in a skill wagering interleaved game 816. The contribution of elements, such as E 808, can be linked to a player's access to credits, such as RC 804 and/or GWC 806. Electronic receipt of these credits can come via a smart card, voucher or other portable media, or as received over a network from a server. In some embodiments, these credits can be drawn on demand from a player profile located in a database locally on a tournament entry mechanism in a skill wagering interleaved game or in a remote server.

Figure 9:
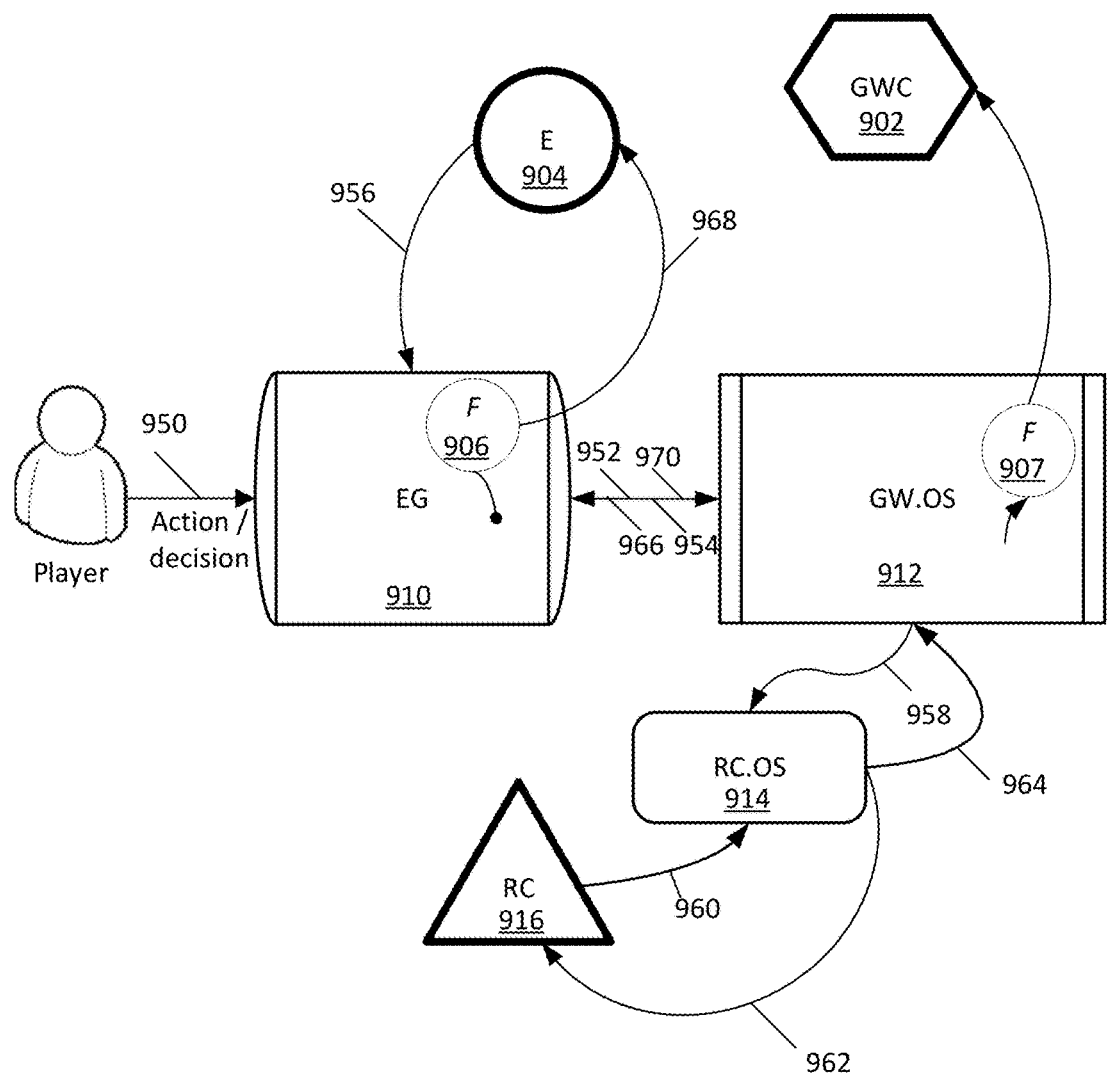
FIG. 9 illustrates a conceptual diagram of the interplay between aspects of a tournament entry mechanism in a skill wagering interleaved game using real world currency in accordance with some embodiments of the invention.

A conceptual diagram that illustrates interplay between elements and components of a tournament entry mechanism in a skill wagering interleaved game in accordance with an embodiment of the invention is illustrated in FIG. 9. Similar to FIG. 8, a player's actions and/or decisions can affect functions 906 and 907 that consume and/or accumulate GWC 902 and/or E 904 in a tournament entry mechanism in a skill wagering interleaved game entertainment game executed by an EG 910, a RC.OS 914 and a GW.OS 912. The GW.OS 912 can monitor the activities taking place within a tournament entry mechanism in a skill wagering interleaved game entertainment game executed by an EG 910 for gameplay gambling event occurrences. The GW.OS 912 can also communicate the gameplay gambling event occurrences to the RC.OS 914 that triggers a gambling event and/or wager of RC 916 in a gambling game executed by the RC.OS 914.

In the figure, the player commences interaction with the skill wagering interleaved game with tournament entry mechanism by contributing one or more of three types of credits to the adapted skill wagering interleaved game: (i) RC 916 which is a currency fungible instrument, (ii) GWC 902 which are game world credits, and (iii) E 904 such as an enabling element (EE) of the entertainment portion of the skill wagering interleaved game with tournament entry mechanism executed by the EG. In many embodiments, an EE is an element consumed by, traded or exchanged in, operated upon, or used to enable the entertainment game portion of the adapted skill wagering interleaved game. There may be one or more types of EE present in a tournament entry mechanism in a skill wagering interleaved game's entertainment game. Embodiments of EE include, but are not limited to, bullets in a shooting game, fuel in a racing game, letters in a word spelling game, downs in a football game, potions in a character adventure game, and/or character health points, etc.

The contribution of one or more of these elements may be executed by insertion into the skill wagering interleaved game with tournament entry mechanism of currency in the case of RC, and/or transferred in as electronic credit in the case of any of the RC, GWC and/or EE. Electronic transfer in of these credits may come via a smart card, voucher or other portable media, or as transferred in over a network from a patron server or skill wagering interleaved game with tournament entry mechanism player account server. In many embodiments, these credits may not be transferred into the adapted skill wagering interleaved game. Instead the credits may be drawn on demand from player accounts located in servers residing on the network or in the cloud on a real time basis as the credits are consumed by the adapted skill wagering interleaved game. Once these credits are deposited, or a link to their availability is made, the skill wagering interleaved game with tournament entry mechanism has the credits at its disposal to use for execution of the adapted skill wagering interleaved game. Generally, the RC is utilized and accounted for by the RC.OS 914; and the E 904 and GWC 902 are utilized and accounted for by the GW.OS 912 and/or the EG 910.

In accordance with some embodiments of the invention, the following may occur during use of the gambling hybrid game. The user enters an input that represents an action or decision (950). The EG 910 signals the GW.OS 912 with the input decision or action (952). The GW.OS 912 responds by signaling to the EG 910 the amount of EE that is consumed by the player action or decision (954). The signaling from the GW.OS 912 configures a function 906 to control the E consumption, decay, and/or accumulation.

The EG 910 then adjusts the E 904 accordingly (956). The GW.OS 912 signals the RC.OS 914 as to the profile of the wager proposition associated with the action or decision and triggers a gambling event and the wager (958). The RC.OS 914 consumes the appropriate amount of RC 916, executes the gambling event and resolves the wager (960). The RC.OS 914 then adjusts the RC 916 based upon the outcome of the wager (962) and informs the GW.OS 912 as to the outcome of the wager (964).

The GW.OS 912 signals the EG 910 to adjust EE to one or more of the EEs of the EG entertainment game (966). Function 906 of the EG 910 performs the adjustment of EE 904 (968). The EG 910 signals the GW.OS 912 as to the updated status (970). In response, the GW.OS 912 updates the GWC 902 using a function 907 (972) and may provide an update of the GWC to the EG 910.

The following is an example of the above flow in a first person shooter game, such as Call of Duty®, using a tournament entry mechanism in a skill wagering interleaved game sequence in accordance with embodiments of the invention.

The process begins by a player selecting a machine gun to use in the game and then fires a burst of bullets at an opponent (950). The EG 910 can signal to the GW.OS 912 of the player's choice of weapon, that a burst of bullets was fired, and/or the outcome of the burst (952). The GW.OS 912 processes the information received and signals the EG 910 to consume 3 bullets (EE) with each pull of the trigger (954). The ESE 910 consumes 3 bullets for the burst using function 906 (956).

The GW.OS 912 signals the RC.OS 914 that 3 credits (RC) are to be wagered on the outcome of a gambling event to match the three bullets consumed. The RC.OS 914 then performs the gambling event and determines the result of the wager and may determine the winnings from a pay table. On a particular pay table (Table Ln-RC), a determination is made by RC.OS 914 as to the amount of damage that the opponent has sustained. The RC.OS 914 consumes 3 credits of RC 916 for the wager and executes the specified wager (960). By way of example, the RC.OS 914 may determine that the player hit a jackpot of 6 credits and returns the 6 credits to the RC 916 (962) and signals the GW.OS 912 that 3 net credits were won by the player (964).

The GW.OS 912 signals the EG 910 to add 3 bullets to an ammunition clip (966). The EG 910 adds 3 bullets back to the ammo clip (EE 904) using a function 906 (968). The ammunition may be added by directly adding the ammunition to the clip or by allowing the user to find extra ammunition during gameplay. The GW.OS 912 logs the new player score (GWC 902) in the game (as a function of the successful hit on the opponent) based on the EG 910 signaling, and adds 2 extra points to the player score since a jackpot has been won (970). The GW.OS then adds 10 points to the player score (GWC 902) given the success of the hit which in this example is worth 8 points, plus the 2 extra points (972). Note that the foregoing example is only intended to provide an illustration of how credits flow in a gambling hybrid game, but is not intended to be exhaustive and only lists only one of numerous possibilities of how a gambling hybrid game may be configured to manage its fundamental credits.

Note that the foregoing embodiments are intended to provide an illustration of how credits flow in a tournament entry mechanism in a skill wagering interleaved game, but are not intended to be exhaustive, and only list one of numerous possibilities of how a tournament entry mechanism in a skill wagering interleaved game may be configured to manage its fundamental credits.

In accordance with some embodiments, the tournament entry mechanism in the skill wagering interleaved game system of FIG. 9 may provide a tournament entry mechanism in a skill wagering interleaved game with credits in a virtual currency versus credits in a real currency. Virtual currency can be thought of as a form of alternate currency which can be acquired, purchased or transferred in unit or in bulk by/to a player but does not necessarily directly correlate to a real currency. In a number of embodiments, there is a virtual currency called "Triax Jacks". 1000 units of "Triax Jacks" are given to a player by an operator of a tournament entry mechanism in a skill wagering interleaved game with additional blocks of 1000 units being available for purchase for $5 USD for each block. Triax Jacks could be redeemed for various prizes. Alternatively, the Triax Jacks could never be redeemed but simply used and traded purely for entertainment value by players. It would be completely consistent with the architecture of the skill wagering interleaved game with tournament entry mechanism that Triax Jacks would be wagered as the RC such that the skill wagering interleaved game with tournament entry mechanism could be played for free or with played with operator sponsored Triax Jacks.

Tournament Entry Mechanisms

In many embodiments of adapted skill wagering interleaved games, tournament "tickets" may be obtained during gameplay of the entertainment game and used to gain tournament entry. One or more tickets may be required to gain entry into a particular tournament and different tournaments may specify different sets of ticket requirements. For example, two tickets may be required for entry into a beginner tournament, four tickets for entry into a tournament featuring moderate skill players, and ten tickets for entry into a high skill tournament. Furthermore, tickets may be of a single species or of different species. Different species of tickets may be, for example, blue tickets, red tickets, gold tickets, etc. with each species having a different value. Different amounts and/or different species of tickets may be required for entry into a particular type of tournament. In some embodiments, various combinations of ticket species and amounts may be required in order to gain entry into the same tournament. For example, a player could gain entry into a given tournament by accumulating twenty blue tickets, or the combination of ten blue tickets and four red tickets, or one gold ticket.

A player could accumulate the tournament tickets using various different mechanisms, including as electronic (i.e., "virtual") tickets or as printed paper tickets. In many embodiments, the electronic tickets may be stored within a player account managed by the GW.OS. In several embodiments, the tournament tickets may be accumulated via a smart card, voucher or other portable media to the player. In some embodiments, the tournament tickets may be directly printable by a printer provided by the adapted skilled wagering interleaved games. In some embodiments, the tickets may include various authentication information (e.g., player's name, etc.) that identify the particular player to which the tickets may be redeemed by. In other embodiments, the tickets are not tied to a particular player account and may be redeemed by a person who is in possession of the tickets, similar to real world currency. Once these tournament tickets are accumulated, the player has the tickets at their disposal to use for entry into tournaments after satisfying the particular ticket entry requirements of the tournament.

In some embodiments, the tickets that a player accumulates during game play of the entertainment game may be accumulated across multiple game sessions and retained in a player account. For example, a player can accumulate one ticket per level of game play completed and the player can accumulate tickets even if repeating the same level of game play. In other embodiments, the tickets that a player accumulated during gameplay of the entertainment game may not be accumulated across multiple game sessions. Thus for example, if a player is awarded a certain number of tickets during gameplay of one session of the entertainment game, these tickets may not be added to tickets accumulated in a subsequent game session and thus the player may only be able to obtain as many tickets as the player can skillfully obtain through a single game session.

In some embodiments, tickets that a player accumulates may or may not be able to be accumulated indefinitely, i.e. there may be a maximum number of tickets that can be held in the player's "virtual wallet". When such a limit exists, players may be able to explicitly choose which tickets they hold and/or redeem, or these choices may be made for them. For example, in a skill wagering interleaved game with tournament entry mechanism implementation of the arcade game, Pac-Man™, tickets may be awarded to a player with the successful completion of each level of the game, as illustrated in FIG. 10A. In particular, FIG. 10A illustrates the number of tickets that are awarded after a player is able to successfully complete various different levels of the entertainment game. Thus a player is awarded one blue ticket after completion of level one, one blue ticket after completion of level two, and so forth. The player may apply these tickets for entry into tournament(s) if the player has obtained the sufficient number and/or species of tickets as required for a particular tournament. An example of a tournament entry matrix setting forth ticket requirements for various tournaments in accordance with embodiments of the invention is illustrated in FIG. 10B.

As illustrated in FIG. 10B, in order to gain entry into the low skill tournament, the player needs to accumulate two blue tickets, for entry into the low/medium skill tournament, the player needs three blue tickets, and so forth. Given the aforementioned tables illustrated in FIGS. 10A and 10B, a player may have the choice of one of a number of different tournaments as a function of the tickets they have accumulated during their gameplay of the entertainment game.

As described above, certain embodiments may limit the number of tickets that a player may accumulate within their virtual wallet. As illustrated in FIGS. 10A and 10B, in embodiments that limit the number of tickets that the player may hold in the player's virtual wallet to, for example, three tickets, the player is faced with a decision after completion of level three as to whether to keep the three blue tickets, thereby ensuring that the player can enter the low skill or the low/medium skill tournament with less appealing prizes (which require either two blue or three blue tickets), or to keep only the one gold ticket. By keeping the one gold ticket, the player can ensure entry into the medium skill tournament, yet the player preserves the option to acquire more gold tickets by successfully completing higher levels in the game and thereby the player gains the opportunity to enter the higher skill tournament which provides ostensibly more valuable prizes.

The examples described above illustrate different aspects of the tournament entry mechanisms within gambling integrated games, including the different species of tickets and the virtual wallet. Furthermore, as described above, the tournament entry mechanisms of some embodiments may vary ticket awards during gameplay of an entertainment game as a function of a player's skilled performance or provide stratified tournaments for which entry is linked to, but not exclusively driven by, a player's skill level as determined by their ability to collect tickets during gameplay of the entertainment game. In some embodiments, the stratification of tournament entry is more strongly linked to a player's skills by having different ticket types awarded for more substantial in-game achievements, and not having any overlap in ticket types awarded as a function of, for example, the game level completed.

As described above, some embodiments provide tickets that can be accumulated across multiple sessions. An example of a tickets that may be awarded for different levels completed within an entertainment game in accordance with embodiments of the invention is illustrated in FIG. 11A. As illustrated, after the player successfully completes different levels of an entertainment game, the player is awarded with a certain number/species of ticket(s). For example, after completing level one, the player is awarded one blue ticket. Likewise, after the player completes level two, the player is awarded another blue ticket and thus has an accumulated total of two blue tickets. Note that the player may be allowed to, in some embodiments, repeat levels to accumulate tickets. For example, the player may repeat level one to obtain a second blue ticket. The player may use their accumulated tickets in order to gain entry into a tournament based on the particular ticket requirements of the tournament. An example of ticket requirements for entry into different tournaments is illustrated in FIG. 11B.

As illustrated in the example in FIG. 11B, a player would need to either (i) play six games where they only cleared level one, or (ii) play three games where they cleared levels one and two, before the player would have accumulated the requisite number of blue tickets for entry into the low skill tournament. Likewise, a player would need to make it through level three four times before they could enter the medium skill tournament (which requires four red tickets), and the player would have to clear level four three times, or make it through level six once (or some other combinations of game result involving level five) before they could enter the high skill tournament which requires three gold tickets. Thus, in some embodiments the player may accumulate tickets within their virtual wallet during different sessions of gameplay of the entertainment game and the more that the player plays the entertainment game, the more tickets that the player will accumulate.

In some embodiments, ticket availability is not expressly tied to player skill or achievement. In particular, tickets that are typically associated with higher skill or achievement may, on occasion, be made randomly available. In particular, a lower skilled player may occasionally find or be awarded tickets that allow the player to gain entry into a higher level tournament, regardless of the player's skill level. In some embodiments, the player may be randomly awarded tickets that allow them to more quickly gain entry into tournaments that would otherwise require the player to play multiple sessions of the entertainment game. In some embodiments, the skill wagering interleaved game with tournament entry mechanism may utilize a random number generator to randomly award tickets. For example, in addition to the tickets awarded for different levels of gameplay completion as illustrated in FIG. 11A, the random number generator may be executed after completion of a particular level (e.g., level 3) such that a particular ticket is awarded with a particular probability. For example, the random number generator may award a red tick with a one out of four probability.

In some embodiments, the random availability of a ticket need not be coincident with the end or completion of a level, or with a natural "break" in the action of the game. Some embodiments may incorporate the tickets within the actual gameplay of the entertainment game. For example, within the Pac-Man™ entertainment game, a ticket could be placed within the game maze to be "gobbled up" by the controlled icon (thereby signifying capture of that ticket within the player's account). In a first person shooter entertainment game, the ticket may be placed within the environment and the player may, for example, shoot the ticket in order to be awarded the ticket. In some embodiments, tickets placed within the gameplay of the entertainment game may persist so long as the game is being played, or can have a specified shelf life, after which time they are no longer available to be collected by the player. For example, in the Pac-Man™ entertainment game, the ticket may be displayed on the game maze for 30 seconds before disappearing from the display.

Figure 12:
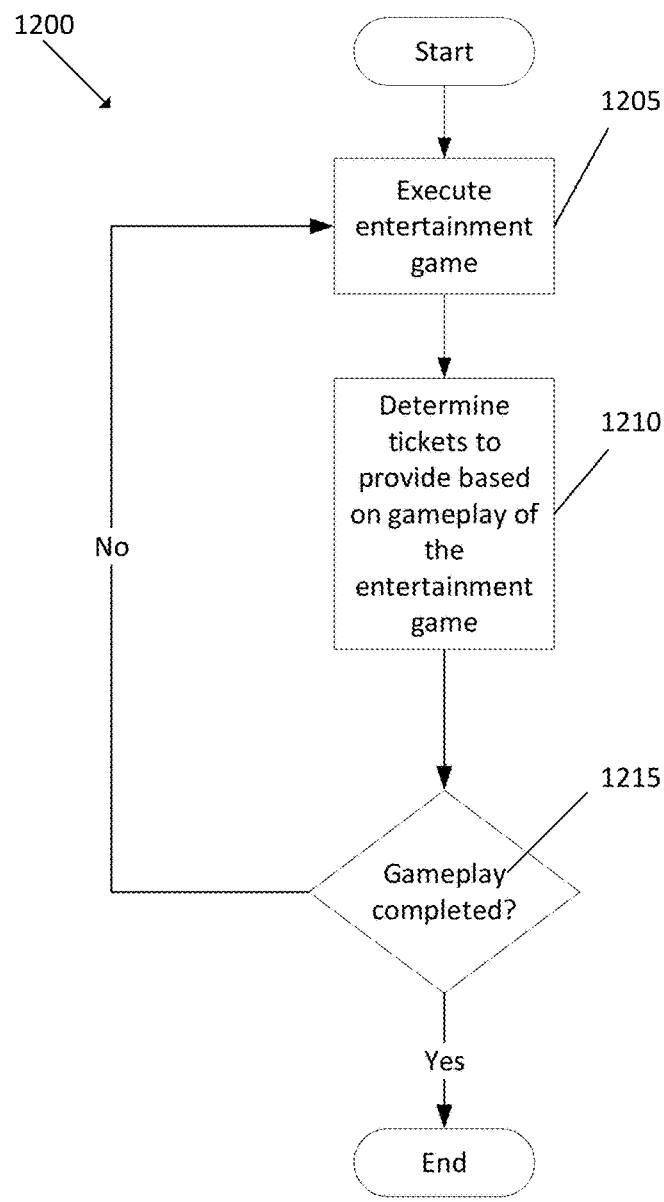
FIG. 12 conceptually illustrates a process flow diagram for a system for tournament entry based on gameplay of a tournament entry mechanism in a skill wagering interleaved game in accordance with embodiments of the invention.

A process flow diagram for a system for tournament entry based on gameplay of a tournament entry mechanism in a skill wagering interleaved game in accordance with an embodiment of the invention is illustrated in FIG. 12. At the start, the entertainment game is executed (1205). The player may play the entertainment game based on the particular characteristics of the game. The process determines (1210) ticket(s) to provide to the player based on the gameplay of the entertainment game. In some embodiments, the tickets may be provided during the play of a particular level of the entertainment game such as tickets that are embedded within the display of the entertainment game. In some embodiments, the tickets may be provided based on the particular level(s) that the player has successfully completed in the entertainment game. The process determines (1215) whether the gameplay has completed, and if it has completed, the process ends. Otherwise, the process returns to 1205 to continue execution of the entertainment game.

Although a flow diagram for various adapted skill wagering interleaved games providing tournament entry are discussed above with reference to FIG. 12, various adapted skill wagering interleaved games providing tournament entry can be in any configuration as appropriate to the requirements of specific applications in accordance with embodiments of the invention.

In some embodiments, the availability of a ticket can be made a function of skill and a random element, rather than exclusively one or the other. In some embodiments, tickets can be either awarded or made available, or both, within the context of a given game. In particular, when tickets are awarded to a player, they are provided directly to the player as a function of player achievement and/or random results, but need not be explicitly collected by the player. Likewise, when tickets are made available to the player, the player is given an opportunity to collect a ticket by virtue of inclusion of the ticket (as represented by an appropriate icon along with—in some cases—sound, etc.) in the game play environment. In this case, the player may act explicitly to collect the ticket. The player action may be one of a number of mechanisms, depending upon the nature of game play, including, but not limited to shooting at the ticket (as in a first person shooter game), finding the ticket, eating the ticket, touching the ticket, buying the ticket, driving through the ticket, etc. based on the particular characteristics of the entertainment game.

In some embodiments, it is possible to exchange a number of lower value tickets for a lesser number of higher value tickets. For example, it may be possible (continuing with the skill wagering interleaved game with tournament entry mechanism examples in FIGS. 10 and 11) to trade 100 blue tickets for a single gold ticket. This would make it possible for a lower skill player to enter a higher level tournament.

In some embodiments, as soon as a player earns a higher level ticket, all lower level tickets earned within that game are expunged. In some embodiments, this same effect is in play across multiple game sessions (i.e. lower level tickets in the player's virtual wallet accumulated over multiple games may be expunged as soon as a player earns a higher level ticket).

In many embodiments, tickets acquired by a player may be explicitly tied to a specific player account until they are used, for example, to enter a tournament. In some embodiments, the tickets may be applied for other purposes, including other casino- and regulator-approved purposes). In a number of embodiments, the tickets may be discarded or expire. In some embodiments, the tickets may be traded between players while in other embodiments the tickets may not be traded between players. In certain embodiments, tickets are a form of currency, and can be banked and transferred between one player account and another.

In some embodiments, tickets can either have an indefinite or finite life. In the former case, a ticket, once in the possession of a player in their account does not expire. In the latter case, a ticket may eventually expire. Specifically, after a specific amount of elapsed time, or after a certain fixed time and date has come to pass, the ticket may not be able to be used to gain entry into a tournament. For example, tickets earned during game play in January may only be useful for entering a tournament slated for February of the same year. Once the date of the tournament has passed, tickets that were not used may not be used to enter a tournament on a subsequent date. Similarly, in several embodiments, tickets may be explicitly linked to a specific tournament or tournaments in the future, and may not be usable to gain entry to tournaments other than the one or more so specified. In a variation, in some embodiments, the value of a ticket may decline after a certain date, or after a certain tournament has transpired, but may still be used to gain entry into subsequent tournaments. For example, gold tickets earned by a player in February may be used to enter a tournament that month at the rate of five tickets to enter the February tournament. However, the gold tickets can also be used to enter a March tournament, though for this tournament, ten such tickets, rather than five of the earned in February gold tickets, would be required.

Figure 13:
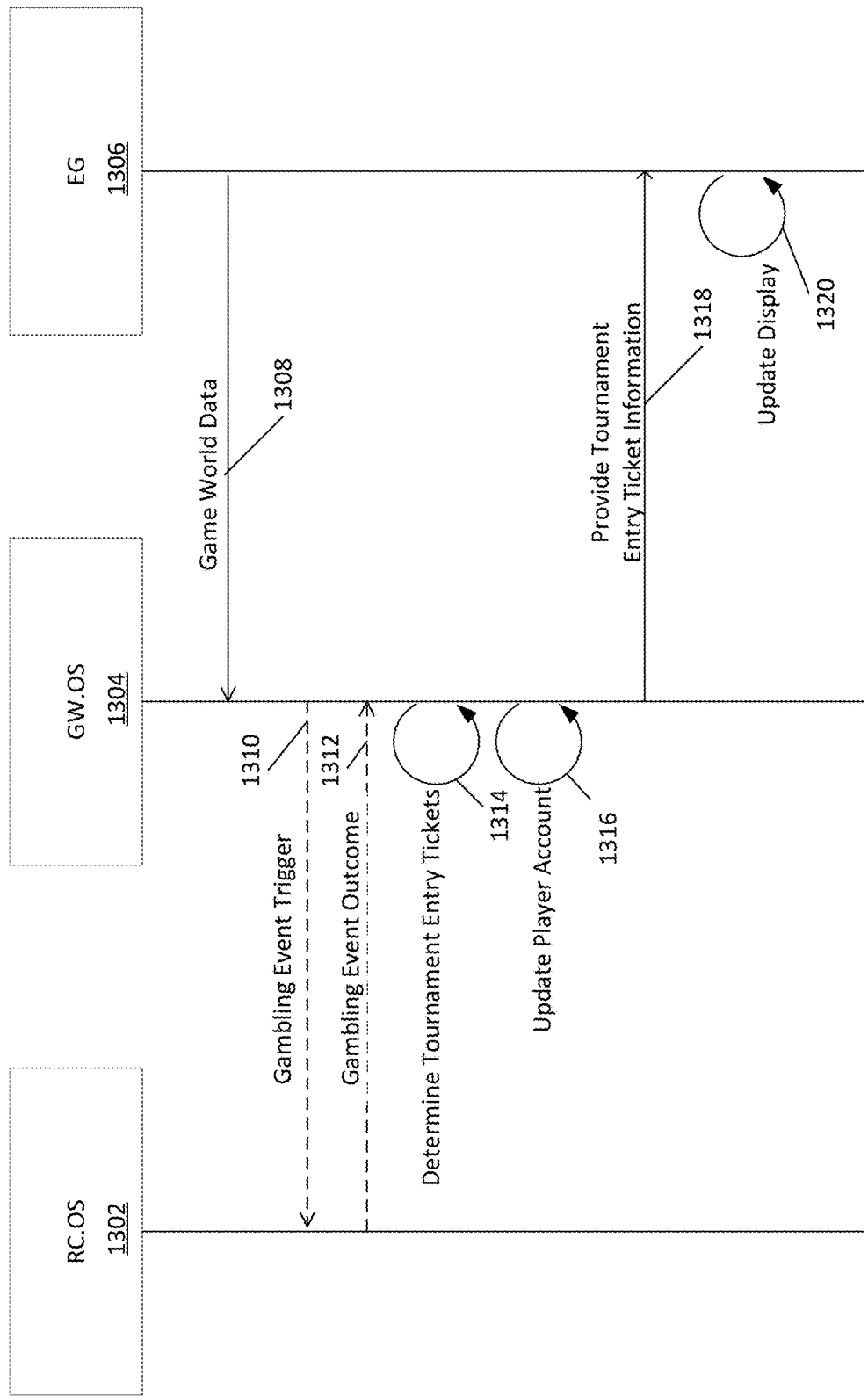
FIG. 13 illustrates a timing diagram of information passed between components of a tournament entry mechanism in a skill wagering interleaved games that provide tournament entry based on gameplay in accordance with embodiments of the invention.

Processes for Providing Tournament Entry in Adapted Skill Wagering Interleaved Games Systems that provide adapted skill wagering interleaved games that include tournament entry, as described above, in accordance with embodiments of the invention are shown in FIGS. 13-16. A timing diagram of the information passed between various components of a tournament entry mechanism in a skill wagering interleaved game to provide tournament entry in accordance with embodiments of the invention is shown in FIG. 13. The process begins when the entertainment game (EG) 1306 interacts with the player by providing the entertainment game. Based on progression of the entertainment game, the EG 1306 generates and provides an update of entertainment game information to the GW.OS (1308). The GW.OS 1304 may optionally determine that a gambling event is to occur based on the updated status of the entertainment game. To resolve the gambling event, the GW.OS may optionally provide a request (1310) for the gambling event to the RC.OS 1302 whereby the RC.OS determines the result of the gambling event. The result of the gambling event is provided by the RC.OS to GW.OS (1312). The GW.OS determines (1314) tournament entry tickets to award to the player based on the game world data received and/or based on the result of the gambling event. The GW.OS updates the player's account with the tournament information. The GW.OS provides the tournament ticket entry information to EG (1318). The EG updates the user interface according to the received tournament ticket information and presents the updated interface to the player while providing the entertainment game (1320).

Figure 14:
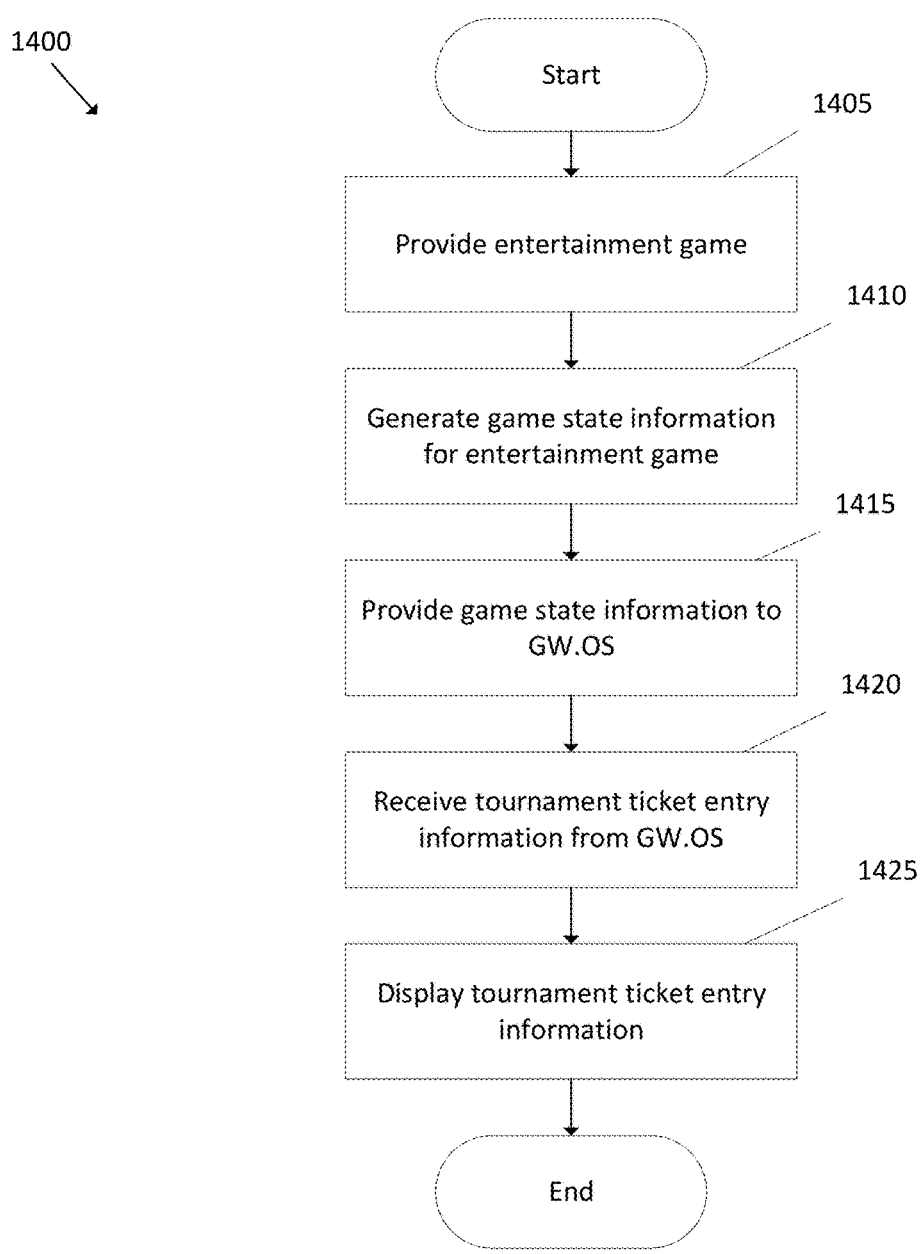
FIG. 14 illustrates a flow diagram of a process performed by an entertainment game (EG) to provide a tournament entry mechanism in a skill wagering interleaved games having tournament entry in accordance with embodiments of the invention.

A process performed by an EG for providing entertainment games within adapted skill interleaved games that provide tournament entry based on the gameplay of an entertainment game in accordance with embodiments of this invention is shown in FIG. 14. In process 1400, the EG provides the entertainment game to a player (1405). At a particular point in the entertainment game, the EG generates status update information (1410). The status update information is provided to the GW.OS by the EG (1415). The EG receives tournament ticket entry information from the GW.OS (1420) and the EG updates the tournament ticket entry information of an interface accordingly (1425).

Figure 15:
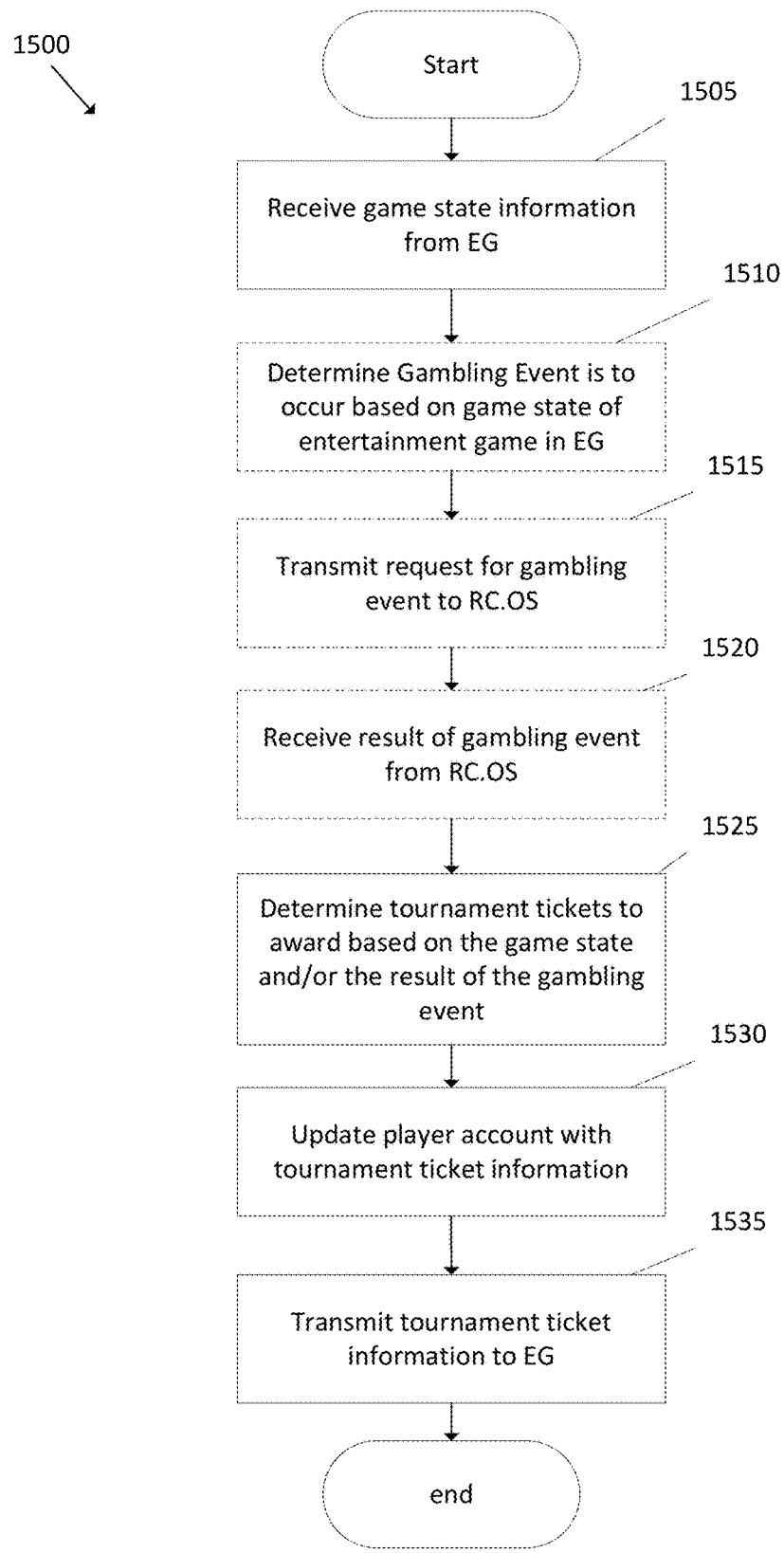
FIG. 15 illustrates a flow diagram of a process performed by a game world operating system (GW.OS) to provide a tournament entry mechanism in a skill wagering interleaved games having tournament entry in accordance with embodiments of the invention.

A process for providing adapted skill interleaved games with tournament entry performed by a GW.OS in accordance with embodiments of the invention is shown in FIG. 15. In process 1500, the GW.OS receives status update information from the EG (1505). The GW.OS may determine (optional, as indicated by the dashed lines) a gambling event that is to occur based on status of the entertainment game (1510). The determination may be made by any metric in the entertainment game that may indicate that a gambling event associated with game play is to occur. Furthermore, as described above, the determination may also use a past gambling event and/or RNG results to make the determination of the gambling event. GW.OS also may determine an amount to wager on a gambling proposition of the gambling event. The GW.OS may request (optional) the determined gambling event be performed by the RC.OS (1515). The request may include the amount of RC wager on the proposition. The GW.OS may receive (optional) the results of the gambling event from the RC.OS (1520). The results provided to the GW.OS may also include RNG results and other information. The GW.OS determines (1525) tournament tickets to award based on the game state information of the entertainment game and/or the results of the gambling event. The GW.OS updates (1530) player account information with the tournament ticket entry information. The tournament ticket entry information is transmitted by the GW.OS to the EG (1535).

Figure 16:
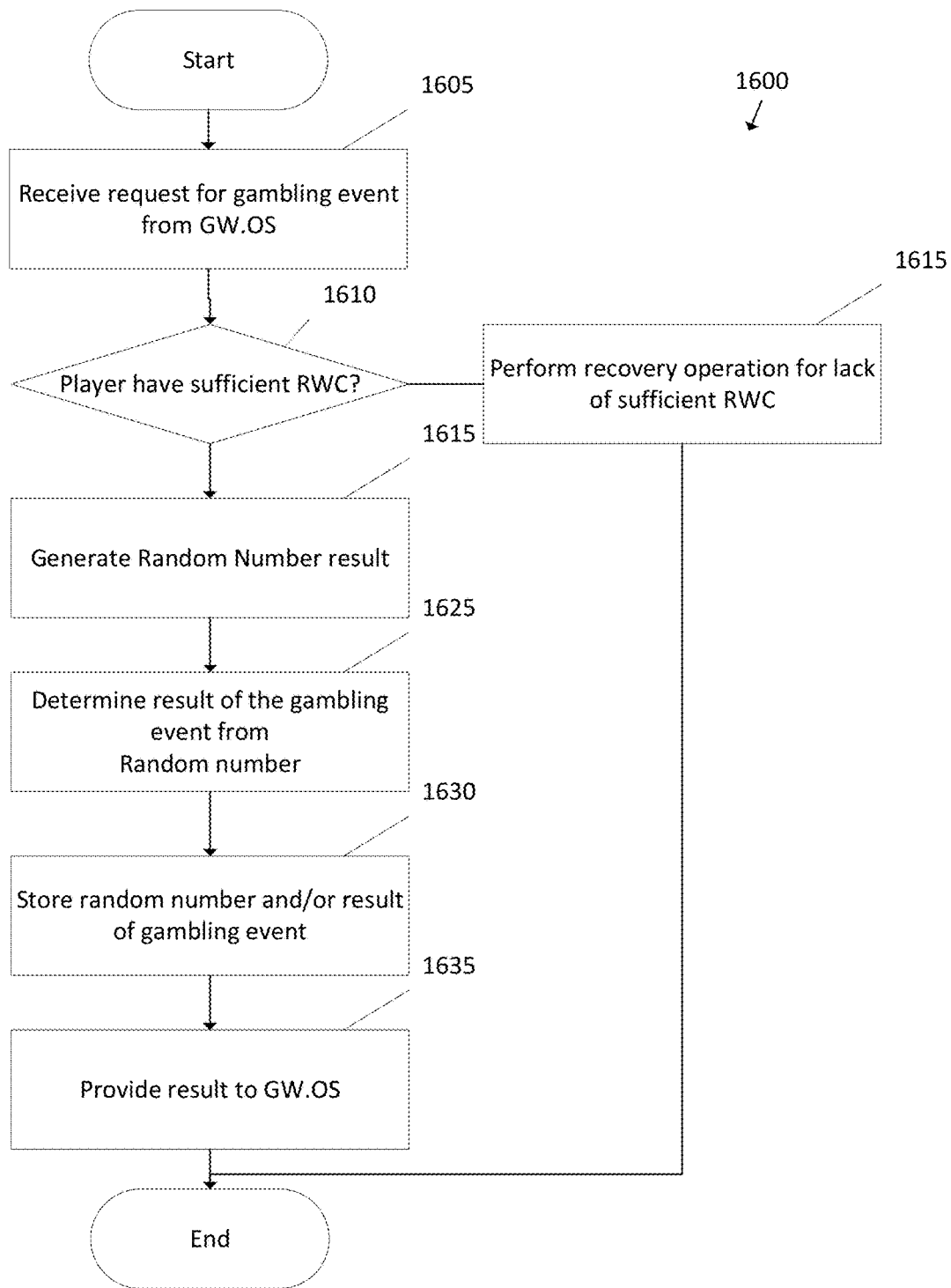
FIG. 16 illustrates a flow diagram of a process performed by a real credit operating system (RC.OS) to provide a tournament entry mechanism in a skill wagering interleaved games in accordance with embodiments of the invention.

A process performed by the RC.OS to determine the results of the gambling events and provide the results to the GW.OS in accordance with embodiments of the invention is shown in FIG. 16. In process 1600, the RC.OS receives a request for a gambling event from the GW.OS (1605). The request may include amount wagered, an indication of a proper RNG to use, and an indication of the pay tables to use to resolve the wager. The RC.OS determines whether the player has sufficient RC available to cover the wager (1610). If the player does not have sufficient RC to cover the wager, the RC.OS performs a recovery operation (1615). The recovery operation may prevent the wager from occurring or may allow the player to supply the necessary funds to cover the wager. If the player has sufficient RC, the RC.OS generates a random number result using the proper RNG (1620). The random number result is used to determine the results of the gambling event and do all other appropriate operations for updating the RC.OS available to the player (1625). The RC.OS may store the result and/or other information about the result, including the random number result, in a database for future use (1630). The RC.OS also provides the result of the gambling event to the GW.OS (1635).

While the above description may include many specific embodiments of the invention, these should not be construed as limitations on the scope of the invention, but rather as an example of one embodiment thereof. It is therefore to be understood that the present invention can be practiced otherwise than specifically described, without departing from the scope and spirit of the present invention. Thus, embodiments of the present invention should be considered in all respects as illustrative and not restrictive.

What is claimed is:

1. A casino electronic game machine providing a tournament entry mechanism in a gambling hybrid game that includes an entertainment game and a gambling game, comprising:
   a real credit operating system comprising:
      a real world credit meter;
      a random number generator; and
      a real world credit pay table, wherein the real credit operating system is configured to:
         receive real world credit from a portable media, wherein the portable media includes at least one member of a group including currency, a voucher and a smart card; and
         provide a randomly generated payout of real world credits from a wager of real world credits in the gambling game using the random number generator and real world credit pay table;
         augment an amount of real world credits stored in the real world credit meter based on the randomly generated payout of real world credits to the real world credit meter;
   an entertainment game system constructed to:
      execute the entertainment game to resolve a random event in the entertainment game to generate random event results;
      provide the random event results to a game world operating system;
      receive, from the game world operating system, tournament ticket information, including, when a threshold amount is exceeded, a request to select which tournament tickets to retain;
      update a display screen with the tournament ticket information; and
      accept a user input to determine which tournament tickets to retain;
   the display screen configured to:
      display the random event results of the wagers; and
      display the tournament ticket information;
   a user input device configured to receive from a player a wagering amount to use during game play; and
   the game world operating system constructed to:
      determine an occurrence of a gambling event in the gambling game based on play of the entertainment game executed by the entertainment game system;
      request a resolution to the gambling event by the real credit operating system;
      determine gambling results based upon the random event results;
      determine at least one of an amount and a species of tournament tickets to provide to a player account based on gameplay of the entertainment game and the result of the gambling event wherein different species of tickets have different values, wherein one or more lower value species of tournament tickets is tradable for a higher value species of a tournament ticket;
      set the threshold amount based on a maximum number of tournament tickets that can be held by a player's wallet;
      determine if the number of tournament tickets provided exceed a threshold amount;
      send the tournament ticket information to the entertainment game system including, when the threshold amount is exceeded, a request to select which tickets to retain in the player's wallet;
      provide the gambling results to the entertainment game system for use in executing the entertainment game;
      receive the user input determining which tournament tickets to retain; and
      update the player account with the tournament ticket information.

2. The casino electronic game machine of claim 1, wherein the game world operating system is further constructed to determine the tournament tickets to provide to the player based on levels completed during gameplay of the entertainment game.

3. The casino electronic game machine of claim 1, wherein the game world operating system is further constructed to determine the tournament tickets to provide to the player based on tournament tickets explicitly obtained by the player during gameplay of the entertainment game.

4. The casino electronic game machine of claim 1, wherein the game world operating system is further constructed to determine the tournament tickets to provide to the player based on a random award of tournament tickets determined by a random number generator.

5. The casino electronic game machine of claim 1, wherein the game world operating system is further constructed to determine to request the real credit operating system to determine the result of the gambling event based on an updated status of the entertainment game.

\* \* \* \* \*